United States Patent
Hildreth et al.

(10) Patent No.: US 9,466,266 B2
(45) Date of Patent: Oct. 11, 2016

(54) DYNAMIC DISPLAY MARKERS

(71) Applicant: QUALCOMM Incorporated, San Diego, CA (US)

(72) Inventors: Evan Robert Hildreth, Thornhill (CA); Babak Forutanpour, Carlsbad, CA (US); Phuong Lam Ton, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 35 days.

(21) Appl. No.: 14/012,457

(22) Filed: Aug. 28, 2013

(65) Prior Publication Data
US 2015/0062159 A1   Mar. 5, 2015

(51) Int. Cl.
*G09G 5/377* (2006.01)
*G02B 27/01* (2006.01)
(Continued)

(52) U.S. Cl.
CPC .............. *G09G 5/377* (2013.01); *A63F 13/26* (2014.09); *G02B 27/017* (2013.01); *G02B 27/0172* (2013.01); *G06F 21/84* (2013.01); *G06T 19/006* (2013.01); *H04N 21/4122* (2013.01); *G02B 2027/0178* (2013.01); *G02B 2027/0181* (2013.01); *G02B 2027/0198* (2013.01); *G06F 2221/032* (2013.01); *G09G 2340/12* (2013.01);
(Continued)

(58) Field of Classification Search
CPC ... G06T 19/006; G06T 7/0018; G06F 3/011; G06F 3/017; G02B 27/017; G02B 2027/014; G02B 2027/0178; G02B 2027/0187; G02B 27/32; A63F 13/10; A61B 2019/5225; G09G 5/373
See application file for complete search history.

(56) References Cited

U.S. PATENT DOCUMENTS 5,203,591 A * 4/1993 Treat .................... G06K 7/1434
                                                        235/494
5,506,411 A * 4/1996 Tasaki ................ G06K 7/10851
                                                        235/462.25
(Continued)

FOREIGN PATENT DOCUMENTS

GB         2360414 A        9/2001

OTHER PUBLICATIONS

Billinghurst M., et al., "Collaborative Mixed Reality," in Proceedings of the First International Symposium on Mixed Reality, Mixed Reality—Merging Real and Virtual Worlds, Berlin: Springer Verlag, 1999, pp. 261-284.

(Continued)

*Primary Examiner* — Quan-Zhen Wang
*Assistant Examiner* — Dong Hui Liang
(74) *Attorney, Agent, or Firm* — Kilpatrick Tonwnsend & Stockton LLP

(57) ABSTRACT

Various arrangements for defining a marker are presented. A first defined marker presented by a public display device may be determined to be insufficient for use by a head mounted display. The first defined marker may be used as a reference point for positioning information for display by the head mounted display. In response to determining that the first defined marker is insufficient, a second marker displayed by the public display device may be defined. The second marker may have a display characteristic different from the first defined marker. The second defined marker may then be used as the reference point for positioning the information for display by the head mounted display. An indication of the second marker may be transmitted to the head mounted display.

38 Claims, 16 Drawing Sheets

(51) Int. Cl.
*G06T 19/00* (2011.01)
*G06F 21/84* (2013.01)
*H04N 21/41* (2011.01)
*A63F 13/26* (2014.01)
*H04N 21/414* (2011.01)

(52) U.S. Cl.
CPC ..... *G09G 2340/14* (2013.01); *H04N 21/41415* (2013.01)

(56) References Cited

U.S. PATENT DOCUMENTS

| | | | |
|---|---|---|---|
| 5,742,263 A * | 4/1998 | Wang | G02B 27/017 345/7 |
| 7,084,887 B1 | 8/2006 | Sato et al. | |
| 8,427,396 B1 | 4/2013 | Kim | |
| 8,502,780 B1 | 8/2013 | Park | |
| 2003/0006957 A1 | 1/2003 | Colantonio et al. | |
| 2003/0046401 A1 | 3/2003 | Abbott et al. | |
| 2004/0028258 A1* | 2/2004 | Naimark | G06K 9/4609 382/103 |
| 2005/0212720 A1 | 9/2005 | Rothman et al. | |
| 2005/0259845 A1 | 11/2005 | Dehlin et al. | |
| 2006/0028400 A1 | 2/2006 | Lapstun et al. | |
| 2009/0141895 A1 | 6/2009 | Anderson et al. | |
| 2010/0045701 A1 | 2/2010 | Scott et al. | |
| 2010/0205667 A1 | 8/2010 | Anderson et al. | |
| 2011/0206285 A1 | 8/2011 | Hodge et al. | |
| 2011/0216060 A1 | 9/2011 | Weising et al. | |
| 2011/0258175 A1* | 10/2011 | Kim | G09G 5/377 707/709 |
| 2011/0319166 A1 | 12/2011 | Bathiche et al. | |
| 2012/0242695 A1 | 9/2012 | Martin | |
| 2012/0242697 A1 | 9/2012 | Border et al. | |
| 2012/0249491 A1 | 10/2012 | Yu et al. | |
| 2012/0249591 A1 | 10/2012 | Maciocci et al. | |
| 2012/0268491 A1* | 10/2012 | Sugden | G06T 13/80 345/633 |
| 2013/0050194 A1* | 2/2013 | Makino | G06T 19/006 345/419 |
| 2013/0117377 A1 | 5/2013 | Miller | |
| 2013/0197997 A1* | 8/2013 | Ross | G06K 7/1095 705/14.49 |
| 2013/0215148 A1* | 8/2013 | Antonyuk | G06T 19/006 345/633 |
| 2013/0258486 A1* | 10/2013 | Ionescu | G02B 27/0172 359/630 |
| 2013/0263215 A1 | 10/2013 | Ekdahl | |
| 2013/0307870 A1 | 11/2013 | Ashbrook | |
| 2014/0263660 A1* | 9/2014 | Jiang | G06K 19/06028 235/491 |
| 2014/0368447 A1 | 12/2014 | Saini | |
| 2015/0062158 A1 | 3/2015 | Hildreth et al. | |

OTHER PUBLICATIONS

Schmalstieg D., et al., "The Studierstube Augmented Reality Project", Presence, vol. 11 (1), Feb. 2002, pp. 33-54.
Grundhofer A., et al., "Dynamic Adaptation of Projected Imperceptible Codes", 2007 6th IEEE and ACM International Symposium on Mixed and Augmented Reality, Nov. 13-16, 2007. 10 pages.
International Search Report and Written Opinion—PCT/US2014/052192—ISA/EPO—Nov. 13, 2014.

* cited by examiner

DYNAMIC DISPLAY MARKERS

CROSS REFERENCES TO RELATED APPLICATIONS

This application is related to U.S. application Ser. No. 14/012,335, filed Aug. 28, 2013, entitled "Integration of Head Mounted Displays with Public Display Devices", which is hereby incorporated in its entirety by reference for all purposes.

BACKGROUND

While a head-mounted display (HMD) presents information such that only the user of the HMD can view the information, this information may be more useful to the user when overlaid in the user's field of vision such that the information appears to be stationary or fixed in relation to what is present in the user's field-of-view. Embodiments detailed herein pertain to defining markers within the field-of-view of a private display device, such as an HMD, for use in positioning information for presentation to a user.

SUMMARY

Various arrangements for defining a marker are described. In some embodiments, a method for defining a marker are presented. The method may include determining, by a display control system, that a first defined marker presented by a public display device is insufficient for use by a head mounted display. The first defined marker may be used as a reference point for positioning information for display by the head mounted display. The method may include, in response to determining that the first defined marker is insufficient, defining, by the display control system, a second marker displayed by the public display device, the second marker being different from the first defined marker. The second defined marker may be used as the reference point for positioning the information for display by the head mounted display. The method may include transmitting, by the display control system, an indication of the second marker to the head mounted display.

Embodiments of such a method may include one or more of the following features: Determining that the first defined marker presented by the public display device is insufficient for use by the head mounted display may include receiving, by the display control system, feedback from the head mounted display, that indicates the first defined marker cannot be located. Determining that the first defined marker presented by the public display device is insufficient for use by the head mounted display may include receiving, by the display control system, distance data indicating a distance between the public display device and the head mounted display; and determining, by the display control system, that the first defined marker is insufficient based at least on the distance between the public display device and the head mounted display. Determining that the first defined marker presented by the public display device is insufficient for use by the head mounted display may include may include measuring, by the display control system, an amount of ambient lighting in a vicinity of the public display device; and determining, by the display control system, that the first defined marker is insufficient based at least on the amount of ambient lighting. Determining the indication that the first defined marker presented by the public display device is insufficient for use by the head mounted display may include calculating, by the head mounted display, a distance between the head mounted display and the public display device; and transmitting, by the head mounted display, an indication of the distance to the display control system. The second defined marker may be larger in size than the first defined marker. The method may include defining, by the display control system, a third marker displayed by the public display device concurrently with the second marker, the third marker having a display characteristic different from display characteristics of the second defined marker. The third defined marker may be used as the reference point for positioning information for display by a second head mounted display. The method may include transmitting, by the display control system, the third marker to the second head mounted display. The third defined marker and the second defined marker may be presented simultaneously as part of public information presented by the public display device. The second defined marker may be a dedicated marker presented by the public display device.

In some embodiments, a system for defining a marker is presented. The system may include one or more processors. The system may include a memory communicatively coupled with and readable by the one or more processors and having stored therein processor-readable instructions. When executed by the one or more processors, the processor-readable instructions may cause the one or more processors to determine that a first defined marker presented by a public display device is insufficient for use by a head mounted display. The first defined marker may be used as a reference point for positioning information for display by the head mounted display. The processor-readable instructions may cause the one or more processors to, in response to determining that the first defined marker is insufficient, define a second marker displayed by the public display device, the second marker being different from the first defined marker. The second defined marker may be used as the reference point for positioning the information for display by the head mounted display. The processor-readable instructions may cause the one or more processors to transmit an indication of the second marker to the head mounted display.

Embodiments of such a system may include one or more of the following: The processor-readable instructions that cause the one or more processors to determine that the first defined marker presented by the public display device is insufficient for use by the head mounted display may include processor-readable instructions which, when executed, cause the one or more processors to receive feedback from the head mounted display, that indicates the first defined marker cannot be located. The processor-readable instructions that cause the one or more processors to determine that the first defined marker presented by the public display device is insufficient for use by the head mounted display may include processor-readable instructions which, when executed, cause the one or more processors to: receive distance data indicating a distance between the public display device and the head mounted display; and determine that the first defined marker is insufficient based at least on the distance between the public display device and the head mounted display. The processor-readable instructions that cause the one or more processors to determine that the first defined marker presented by the public display device is insufficient for use by the head mounted display may include processor-readable instructions which, when executed, cause the one or more processors to: measure an amount of ambient lighting in a vicinity of the public display device; and determine that the first defined marker is insufficient based at least on the amount of ambient lighting.

Additionally or alternatively, embodiments of such a system may include one or more of the following: The system may include the head mounted display, configured to: calculate a distance between the head mounted display and the public display device; and transmit an indication of the distance to the display control system. The second defined marker may be larger in size than the first defined marker. The processor-readable instructions, when executed, may further cause the one or more processors to define a third marker displayed by the public display device concurrently with the second marker, the third marker having a display characteristic different from display characteristics of the second defined marker. The third defined marker may be used as the reference point for positioning information for display by a second head mounted display. The processor-readable instructions may further cause the one or more processors to transmit the third marker to the second head mounted display. The third defined marker and the second defined marker may be presented simultaneously as part of public information presented by the public display device. The second defined marker may be a dedicated marker presented by the public display device.

In some embodiments, a non-transitory processor-readable medium for defining a marker is presented. The non-transitory processor-readable medium may include processor-readable instructions configured to cause one or more processors to determine that a first defined marker presented by a public display device is insufficient for use by a head mounted display. The first defined marker may be used as a reference point for positioning information for display by the head mounted display. The non-transitory processor-readable medium may include processor-readable instructions configured to cause the one or more processors to, in response to determining that the first defined marker is insufficient, define a second marker displayed by the public display device, the second marker being different from the first defined marker. The second defined marker may be used as the reference point for positioning the information for display by the head mounted display. The non-transitory processor-readable medium may include processor-readable instructions configured to cause the one or more processors to transmit an indication of the second marker to the head mounted display.

Embodiments of such a non-transitory processor-readable medium may include one or more of the following features: The processor-readable instructions configured to cause the one or more processors to determine that the first defined marker presented by the public display device is insufficient for use by the head mounted display may include processor-readable instructions configured to cause the one or more processors to receive feedback from the head mounted display, that indicates the first defined marker cannot be located. The processor-readable instructions configured to cause the one or more processors to determine that the first defined marker presented by the public display device is insufficient for use by the head mounted display may include processor-readable instructions configured to: cause the one or more processors to receive distance data indicating a distance between the public display device and the head mounted display; and determine that the first defined marker is insufficient based at least on the distance between the public display device and the head mounted display.

Additionally or alternatively, embodiments of such a non-transitory processor-readable medium may include one or more of the following features: The processor-readable instructions configured to cause the one or more processors to determine that the first defined marker presented by the public display device is insufficient for use by the head mounted display may include processor-readable instructions configured to cause the one or more processors to: measure an amount of ambient lighting in a vicinity of the public display device; and determine that the first defined marker is insufficient based at least on the amount of ambient lighting. The processor-readable instructions configured to cause the one or more processors to determine that the first defined marker presented by the public display device is insufficient for use by the head mounted display may include processor-readable instructions configured to cause the one or more processors to receive, from the head mounted display, an indication of a distance between the head mounted display and the public display device to the display control system. The second defined marker may be larger in size than the first defined marker. The processor-readable instructions may be further configured to cause the one or more processors to define a third marker displayed by the public display device concurrently with the second marker, the third marker having a display characteristic different from display characteristics of the second defined marker. The third defined marker may be used as the reference point for positioning information for display by a second head mounted display. The processor-readable instructions may be further configured to cause the one or more processors to transmit the third marker to the second head mounted display. The third defined marker and the second defined marker may be presented simultaneously as part of public information presented by the public display device. The second defined marker may be a dedicated marker presented by the public display device.

In some embodiments, an apparatus for defining a marker. The apparatus may include means for determining that a first defined marker presented by a means for public display is insufficient for use by a means for private display. The first defined marker may be used as a reference point for positioning information for display by the means for private display. The apparatus may include means for defining a second marker displayed by the means for public display in response to determining that the first defined marker is insufficient, the second marker being different from the first defined marker. The second defined marker may be used as the reference point for positioning the information for display by the means for private display. The apparatus may include means for transmitting an indication of the second marker to the means for private display.

Embodiments of such an apparatus may include one or more of the following features: The means for determining that the first defined marker presented by the means for public display is insufficient for use by the means for private display may include means for receiving feedback from the means for private display, that indicates the first defined marker cannot be located. The means for determining that the first defined marker presented by the means for public display is insufficient for use by the means for private display may include: means for receiving distance data indicating a distance between the means for public display and the means for private display; and means for determining that the first defined marker is insufficient based at least on the distance between the means for public display and the means for private display. The means for determining that the first defined marker presented by the means for public display is insufficient for use by the means for private display may include: means for measuring an amount of ambient lighting in a vicinity of the means for public display; and means for determining that the first defined marker is insufficient based at least on the amount of ambient lighting. The means for determining that the first defined marker presented by the means for public display is insufficient for use by the means for private display may include: means for calculating a distance between the means for private display and the means for public display; and means for transmitting an indication of the distance to the display control system. The second defined marker may be larger in size than the first defined marker. The apparatus may include means for defining a third marker displayed by the means for public display concurrently with the second marker, the third marker having a display characteristic different from display characteristics of the second defined marker. The third defined marker may be used as the reference point for positioning information for display by a second means for private display. The apparatus may include means for transmitting the third marker to the second means for private display. The third defined marker and the second defined marker may be presented simultaneously as part of public information presented by the means for public display. The second defined marker may be a dedicated marker presented by the means for public display.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
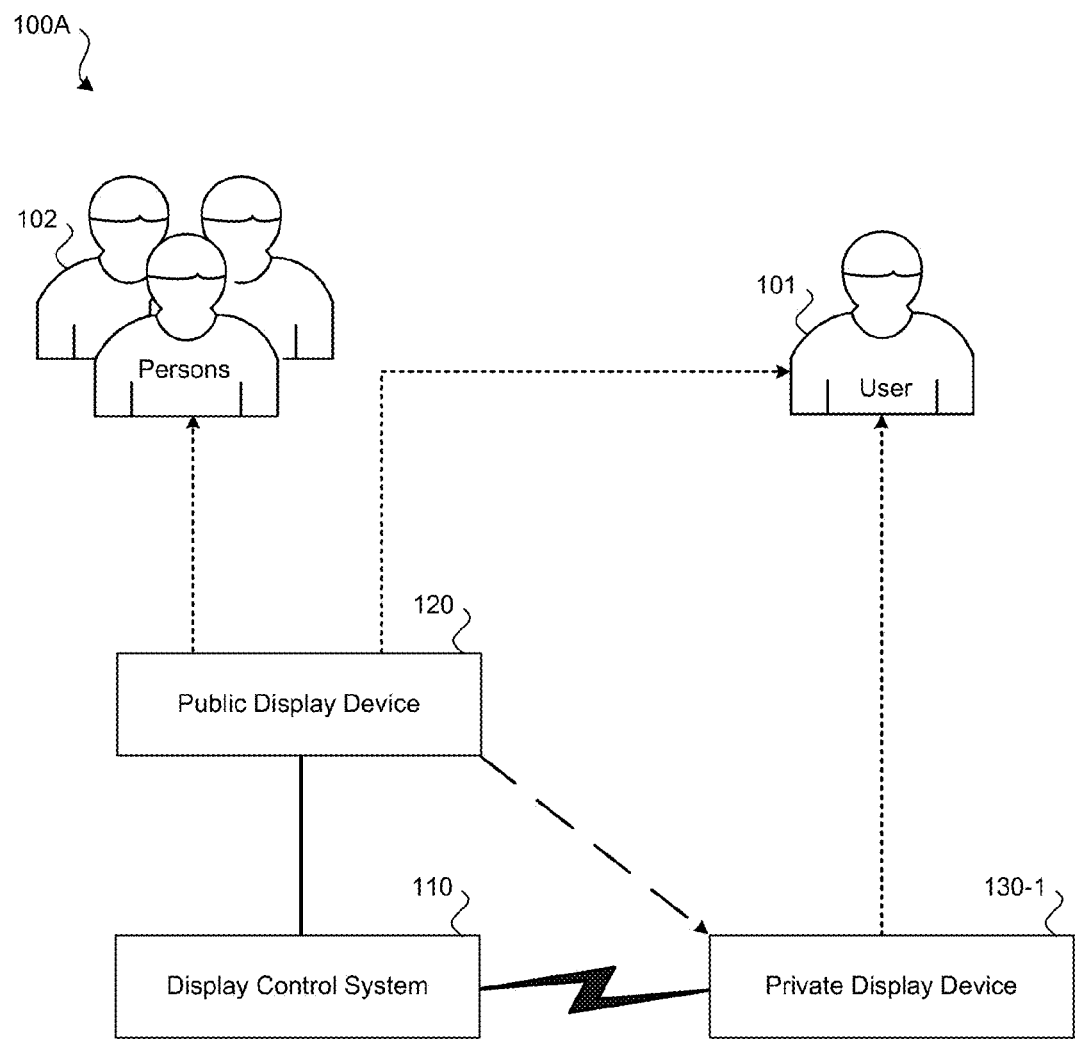
FIG. 1A illustrates an embodiment of a system for presenting private information using a private display in conjunction with a public display to a user.

In some situations, a private display device, such as a head mounted display (HMD), may be used by a user while simultaneously viewing a public display device. Therefore, a user may be simultaneously viewing private information (e.g., text, graphics, video) via the HMD while viewing public information (e.g., text, graphics, video) presented by the public display device. The private information presented by the private display device may be presented in relation to the public information presented by the public display device. In order for the private information to be displayed such that it appears (to the user) to be fixed in position relative to the public information presented by the public display device, a marker may be defined among the public information presented by the public display device. The private display device may locate this marker and present the private information relative to the marker presented among the public information.

A public display device may be a laptop computer screen, a computer monitor, a tablet computer's display screen, an overhead projector, a television, or some other type of display device. A public display device can be defined as a display device that permits multiple users to simultaneously view content presented by the public display device. For instance, a laptop computer screen could be a public display device because two persons can view content presented by the laptop computer screen at the same time. However, an HMD is not a public display device because an HMD is configured to be worn and viewed by a single user at a time. Rather, an HMD may be a type of private display device that permits only the user currently using the HMD to view information presented by the HMD.

In embodiments presented herein, information to be presented to a user may be designated as public or private. Public information, that is, information which is not considered of a private nature, may be presented by the public display device to the user. It may be of little consequence to the user as to whether another person views this public information. For example, icons, web pages, web graphics, videos, operating system information, and/or background graphics are basic examples of information which may be considered public information. Such public information may be presented in a higher resolution, higher brightness level, and/or higher contrast display format than is available via an HMD. Private information may be information that is considered of a private nature to the user. For example, correspondence (e.g., text of an email), biographical data, passwords, comments, financial account information, and the content of documents (e.g., stored text) may be considered private information. Private information may be presented by an HMD directly to the user such that other persons who can view the public display device cannot see the private information. As an example, if the user is writing an email, the address, subject, and text of the email may be treated as private information while all other displayed information may be treated as public information. A person (other than the user wearing the HMD) viewing the public display device may see the public information but not the private information.

To allow the displayed private information to appear located in a fixed position in relation to the public information presented by the public display device, a marker may be defined within the public information being displayed. The marker may be displayed information (e.g., graphics, text, or some combination thereof) from among the public information presented by the public display device that is used as a reference point by the private display device to determine where to position the private information for display. When the private information is presented in a "fixed location," it may appear to the user as if the private information is located in a fixed position in the real world. For example, if the user is using an HMD and is looking directly at a tablet screen and private information is to be superimposed over the tablet screen, if the user turns his head so that the tablet screen is now to the side of the user's field-of-view, the private information may be repositioned in the HMD so that the private information remains superimposed on the tablet screen and therefore appears to the user to have a fixed location in relation to the tablet screen.

Depending on characteristics of the private display device and the characteristics of the operating environment, properties of one or more markers presented by the public display device may be varied for improved performance (e.g., the ability of the private display device to accurately locate the marker). If a private display device is located near the public display device, the private display device may be able to locate a small marker. However, if the private display device is a greater distance from the public display device, a larger marker may be needed. Factors besides distance between the private display device and the public display device that can affect the ability of the private display device to locate a marker may include: ambient lighting conditions, the image sensor quality of the private display device and/or resolution of the private display device's image sensor, the quality of the public display device, objects partially obscuring the public display device (e.g., the head of a person in front of the private display device), etc.

Properties of the marker may be determined and modified such that the marker is sufficient for one or more private display devices to accurately locate the marker. For example, the size, location, color, and/or type (e.g., a dedicated marker or a non-dedicated marker defined from other information) of the marker presented by the public display device may be varied. In some embodiments, rather than using at least a subset of the public information being presented by the public display device as the marker, a dedicated marker may be displayed by the public display device (e.g., a specialized graphic intended to have a high rate of success for use in being properly located by a private display device as the marker). The marker used by different private display devices when viewing a same public display device may vary or may be the same. For instance, a private display device located near the public display device may be able to successfully locate a small marker while another private display device viewing the same public display device from a greater distance may only be able to locate a different and/or larger marker. By having different markers be used based on private display devices' (actual or estimated) ability to locate the markers, the amount of information needed to be provided to each private display device may be decreased or otherwise optimized and/or the private display devices may be able to more reliably locate a sufficient marker.

In some embodiments, each private display device may provide feedback on viewing conditions to a display control system. These viewing conditions may indicate or may otherwise be used to determine the size, shape, colors and/or locations of one or more markers to be designated by the display control system in communication with (or otherwise monitoring the data presented by) the public display device. For example, if a private display device reports to the computer system that it cannot locate a first marker, the display control system in communication with the public display device may designate a second marker (which may have one or more different characteristics, such as a different, size, color, and/or location than the first marker) and may indicate the second marker to the private display device.

In some embodiments, the display control system controlling or monitoring the public information presented by the public display device may monitor characteristics of one or more HMDs being used to view private information in conjunction with the public display device. For instance, an image capture device in communication with the display control system may determine distances to each private display device being used in conjunction with the public display device and the display control system. Other conditions besides distance may be monitored by the computer system using the image capture device, such as ambient lighting conditions and obstructions possibly blocking a private display device's view of one or more markers. Based on the sensed characteristics, such as the distance to each private display device present in the vicinity of the public display device, the marker used for each private display device may be determined or changed by the computer system.

Various systems may involve a user viewing a public display device while simultaneously being presented information via a private display device. Such systems may use one or more markers presented by the public display device to position private information for display by the private display device to the user. FIG. 1A illustrates an embodiment of a system 100A for presenting private information to a user using a private display device in conjunction with a public display device. System 100A may include a display control system 110, a public display device 120, and a private display device 130-1. Display control system 110 may be configured to execute an operating system, one or more applications, and/or receive information to be presented from an external source. The operating system and/or one or more applications may output information to be displayed visually to the user. More detail regarding various embodiments of display control system 110 is provided in relation to FIG. 2. Display control system 110 may be in communication with at least two display devices: public display device 120 and private display device 130-1. In the illustrated embodiment of system 100A, display control system 110 is in wireless communication with private display device 130-1 and is in wired communication with public display device 120. Such an arrangement may vary by embodiment. Wireless or wired communication may be possible between public display device 120, private display device 130-1, and display control system 110.

Information determined to be public may be transmitted by display control system 110 to public display device 120. Part of this public information may be defined as a marker. A marker may be dedicated or defined from among other public information. Public display device 120 may be a display device capable of being simultaneously viewed by multiple persons in a vicinity of public display device 120. For example, common public display devices can include laptop computer screens, tablet computer screens, mobile phone (smartphone) screens, televisions, projectors, and computer monitors. Each of these types of public display devices presents information such that multiple persons can view the information simultaneously. Display control system 110 may assess whether information should be displayed as public or private information. Information, which may include video, graphics, text and other forms of information, that is to be publicly displayed, may be transmitted by display control system 110 to public display device 120.

In many scenarios involving system 100A, the vast majority of information to be presented to a user may be public and thus may be presented to the user via public display device 120. For example, if a user is viewing a public web page and composing an email, the entire web page, the user's desktop background, and the user's start menu (to name only a few examples), may all be presented via public display device 120. Information presented by public display device 120 is represented as being visible to the user by the dotted arrow to user 101. Such information presented by public display device 120 may also be visible to persons 102, who may or may not be present and/or attempting to view public display device 120. User 101 may or may not be aware that one or more of persons 102 are viewing public display device 120 or are in the vicinity. Persons 102 may not be using any private display device or may be using one or more private display devices that are not authorized to receive the private information presented to user 101 via private display device 130-1.

Information determined to be private may be transmitted by display control system 110 to private display device 130-1 for display. Private display device 130-1 may be a display device capable of being viewed by only a single user of private display device 130-1 at a given time. For example, a private display device can be an HMD. An HMD may present information (e.g., graphics and/or text) such that only user 101 who is wearing (or otherwise using) private display device 130-1 can view the information presented by private display device 130-1. While persons 102 may be aware that user 101 is wearing private display device 130-1, it may be difficult or impossible for persons 102 to effectively view the information presented by private display device 130-1 to user 101. Display control system 110 may assess whether information should be presented as public or private information to a user; alternatively, in some embodiments, information for display received by display control system 110 may be tagged as public or private information. In such embodiments, display control system 110 may serve to route the information for display appropriately. Information, which may include graphics and text, that is to be privately displayed, may be transmitted by display control system 110 to private display device 130-1; in some cases, such transmission may be wireless.

Since, in many scenarios involving system 100A, the vast majority of information to be presented to a user may be public and thus may be presented to the user via public display device 120, only small snippets of private information may be present. Returning to the previous example, if a user is viewing a public web page and composing an email, the entire public web page, the user's desktop background, and the user's start menu (to name only a few examples), may all be presented via public display device 120. The private information presented by private display device 130-1 may include text of the email (including email addresses and/or recipients indicated in the "to," "from," and "cc" fields, the subject line, and the body of the email), and/or some pieces of information presented about the user in the web page (e.g., a user name, account number, credit card number). Information presented by private display device 130-1 is represented as being visible to only the user by the dotted arrow to user 101 from private display device 130-1. Such private information is not visible to persons 102.

To enhance the user experience of user 101, as much information may be presented to user 101 via public display device 120 as possible without compromising the privacy of user 101. Public display device 120 may have a higher resolution, a higher contrast ratio, a higher refresh rate, more accurate color reproduction, and/or have access to power more readily than private display device 130-1. As such, it may be desirable to minimize the amount of information presented to user 101 via private display device 130-1. In many instances, information that is identified as private and is to be presented to user 101 by private display device 130-1 may typically be in the form of text, while video and graphics may tend to be presented to user 101 via public display device 120. Generally, HMDs (or some other form of private display device) require one or more batteries for power (such that the HMDs can be wireless). The more information presented by an HMD to user 101, the greater the amount of power that is consumed by the HMD. Therefore, to reduce the capacity of the one or more batteries of the HMD and/or increase the battery life of the HMD, the amount of information presented to user 101 via an HMD may be desired to be minimized.

User 101 may view public display device 120 and private display device 130-1 simultaneously. In some embodiments, information presented to user 101 via private display device 130-1 is overlaid (e.g., superimposed) on the user's view of public display device 120. Again, returning to the previous example, if the user is composing an e-mail, the graphics for the e-mail program may be presented by public display device 120. However, the text of the e-mail may be presented to user 101 by private display device 130-1. To user 101, the text of the e-mail presented by private display device 130-1 may appear as part of the e-mail program presented by public display device 120.

In addition to display control system 110 transmitting the private information for display to the user to private display device 130-1, an indication of the marker being presented by public display device 120 may be transmitted to private display device 130-1 by display control system 110. The indication of the marker may be sufficient for private display device 130-1 to locate the marker being presented by public display device 120. The presentation of the marker by public display device 120 being viewed by private display device 130-1 is illustrated by a dashed line. Depending on ambient conditions, private display device 130-1 may be able to detect the marker presented by public display device 120. Display control system 110 may also provide coordinates, vector information, or some other positioning information that instructs private display device 130-1 where to present the private information in relation to the marker displayed by public display device 120.

In some embodiments, private display device 130-1 may provide feedback to display control system 110 that indicates whether or not the marker indicated to private display device 130-1 has been successfully located (and is being successfully tracked). If the feedback indicates that a first marker cannot be successfully located and/or tracked, the display control system may provide an indication of one or more other markers presented among information displayed by the public display device and may provide corresponding coordinates or vector information that indicates where the private information should be presented in relation to these markers. Private display device 130-1 may provide an indication of a likely reason as to why the first marker cannot be located, such as the ambient environment is too bright, the public display device is small, the private display device has a lower resolution camera, the private display device is located at a far distance from the public display device, etc. Based on the reason indicated, the display control system may designate a new marker tailored to address the reason provided by the private display device.

Figure 1B:
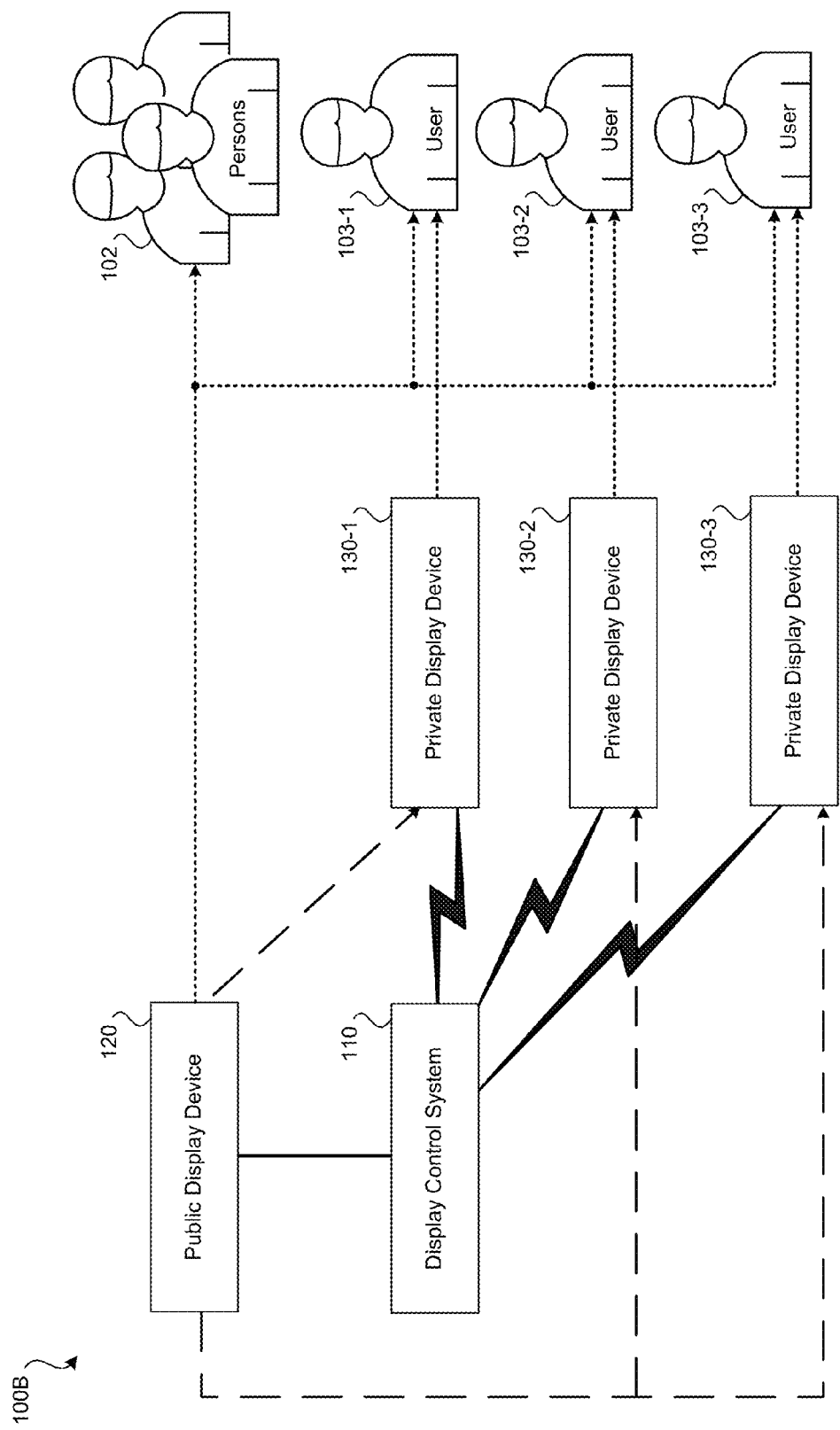
FIG. 1B illustrates an embodiment of a system for presenting different sets of private information to multiple users using multiple private displays and a single public display device.

FIG. 1B illustrates an embodiment of a system 100B for presenting different sets of private information to multiple users. In system 100B, multiple users 103 may be viewing a same public display device 120, but may each be using a private display device that allows users 103 to view the same and/or different private information. Further, one or more persons 102 may be present who can view only the public information presented by public display device 120. System 100B may include a display control system 110, a public display device 120, and private display devices 130. Display control system 110 may be configured to execute an operating system and one or more applications. The operating system and/or one or more applications may output information to be displayed to the multiple users. More detail regarding various embodiments of display control system 110 is provided in relation to FIG. 2. Display control system 110 may be in communication with at least three display devices: public display device 120 and two or more private display devices (e.g., private display device 130-1, private display device 130-2, and private display device 130-3). In the illustrated embodiment of system 100B, display control system 110 is in wireless communication with private display devices 130 and wired communication with public display device 120. Such an arrangement may vary by embodiment. Wireless or wired communication may be possible between public display device 120, private display devices 130, and display control system 110.

Information determined to be acceptable for public display may be transmitted by display control system 110 to public display device 120. Such information may be viewed by users 103 and, if present, one or more persons 102 who may or may not be looking at public display device 120. As previously noted, public display device 120 may be a display device capable of being viewed by multiple persons in a vicinity of public display device 120 such as laptop computer screens, tablet computer screens, mobile phone (smartphone) screens, televisions, projectors, and computer monitors. Each of these public display devices presents information such that multiple persons may view displayed information simultaneously. Display control system 110 may assess whether information should be presented as public or private information to a user. Information, which may include graphics and text, that is to be publicly displayed, may be transmitted by display control system 110 to public display device 120.

In many scenarios involving system 100B, the vast majority of information to be presented to users 103 may be public and thus may be presented to the users via public display device 120. For example, if users 103 are playing an electronic version of cards, such as poker, the graphics for the card game may be presented via public display device 120. Information which may not be presented by public display device 120 includes the specific cards each user of users 103 holds. Information presented by public display device 120 is represented as being visible to the users by the dotted arrows to users 103 from public display device 120. Such information presented by public display device 120 may also be visible to persons 102, which is also represented by a dotted arrow from public display device 120 to persons 102. One or more users of users 103 may or may not be aware that one or more of persons 102 are viewing public display device 120. Persons 102 may not be using any private display device or may be using one or more private display devices that are not authorized to receive the private information presented to users 103 via private display devices 130.

Information determined to be private may be transmitted by display control system 110 to one or more of private display devices 130. Private display devices 130 may be display devices capable of being viewed by only a single user at a time. For example, a private display device can be a head-mounted display. An HMD may present information (e.g., graphics and/or text) such that only the user who is wearing (or otherwise using) a private display device can view information presented by the private display device. While persons 102 and one or more other users of users 103 may be aware that a user is wearing a private display device, it may be difficult or impossible for persons 102 or other users of users 103 to effectively view information presented by the private display device to the user. Display control system 110 may assess whether information should be presented as public or private information to a user. Information, which may include graphics and text, that is to be privately displayed, may be transmitted by display control system 110 to the appropriate one or more private display devices of private display devices 130. In some embodiments, such transmission is wireless.

Each user of users 103 may view the same or different private information. Display control system 110 may have identification information to determine which user of users 103 is using which private display device of private display devices 130. Therefore, private information intended for user 103-1 may be presented only by private display device 130-1; private information intended for user 103-2 may be presented only by private display device 130-2; and finally private information intended for user 103-3 may be presented only by private display device 130-3. Returning to the example of a card game, each private display device of private display devices 130 may present the card numbers (and graphics) specific to its user. Therefore, private display device 130-2 may only present the card numbers for cards held by a user 103-2. Each of users 103 and, possibly, persons 102 may view on public display device 120 other text and/or graphics associated with the card game (e.g., such as a green felt background and an animated representation of a dealer). In some embodiments, multiple private display devices of private display device 130 may present the same private information. For example, during a presentation, user 103-1 and user 103-3 may view the same private information while a user 103-2 is presented either a subset of the private information presented to users 103-1 and 103-3 or different private information and possibly persons 102 are viewers of the presentation not permitted to view any of the private information.

To enhance the user experience of users 103, as much information may be presented to users 103 via public display device 120 as possible without compromising the privacy of each user of users 103. Public display device 120 may have a higher resolution, a higher contrast ratio, a higher refresh rate, and/or more accurate color reproduction than private display device 130-1. As such, it may be desirable to decrease (e.g., minimize) the amount of information presented to users 103 via private display devices 130. Each user of users 103 may view public display device 120 and the user's private display device of private display devices 130 simultaneously. In some embodiments, information presented to users 103 via private display devices 130 may be overlaid on each user's view of public display device 120, thereby giving each user the impression of viewing a single display device. Overlaid information may be opaque or semi-transparent. As such, it may or may not be possible for a user to view information presented by a public display device directly behind information presented by a private display device.

In addition to display control system 110 transmitting the private information for display to the user to private display devices 130, an indication of the marker being presented by public display device 120 may be transmitted to each of private display devices 130 by display control system 110. The indication of the marker may be sufficient for each private display device 130 to locate the marker being presented by public display device 120. The presentation of the marker by public display device 120 being viewed by private display devices 130 is illustrated by a dashed line. Possibly depending on ambient conditions, private display devices 130 may be able to detect the marker presented by public display device 120. Display control system 110 may also provide coordinates, vector information, or some other positioning information that instructs private display device 130-1 where to present the private information in relation to the marker displayed by public display device 120.

In some embodiments, one or more of private display devices 130 may provide feedback to display control system 110 that indicates whether or not the marker indicated to the private display device has been successfully located (and can be tracked). If the feedback indicates that the marker cannot be successfully located and/or tracked, the display control system may provide an indication of one or more other markers and may provide corresponding coordinates or vector information that indicates where the private information should be presented in relation to these markers. Therefore, if private display device 130-1 can locate a marker but private display device 130-2 cannot, a different marker may be defined for and provided to private display device 130-2 or may be defined for and provided to each private display device of private display devices 130.

Each private display device that cannot locate a marker may provide an indication of a likely reason as to why the marker cannot be located, such as the ambient environment is too bright, the public display device is small, the private display device has a lower resolution camera, the private display device is located at a far distance from the public display device, etc. Based on the reason indicated, the display control system may define a new marker tailored to address the reason provided. The new marker may be indicated to each private display device of private display devices 130. The reasons may be used to define a new marker when a new marker is needed to be defined regardless of the ability of a private display device to locate the marker (e.g., the information presented by the public display device changes).

Figure 2A:
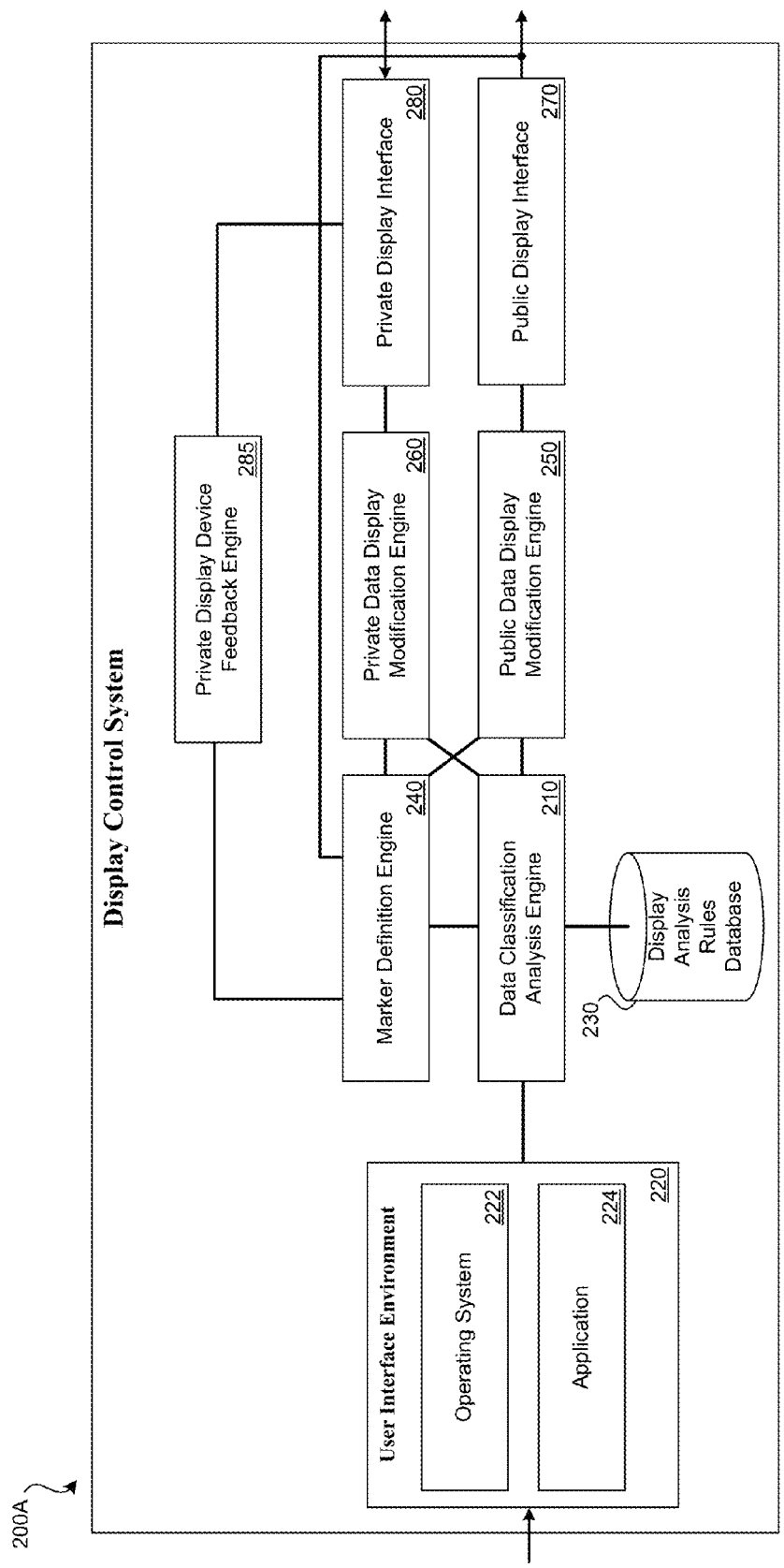
FIG. 2A illustrates an embodiment of a display control system for defining a marker for presentation by a public display device.

FIG. 2A illustrates an embodiment of a display control system 200A for defining a marker for presentation by a public display device. Such a display control system may be a computer system. Display control system 200A of FIG. 2A represents display control system 110 of FIGS. 1A and 1B. However, it should be understood that alternate embodiments of a display control system may be used in systems 100A and 100B of FIGS. 1A and 1B, respectively. Further, display control system 200A of FIG. 2A may be implemented in conjunction with systems other than systems 100A and 100B of FIGS. 1A and 1B, respectively. Display control system 200A of FIG. 2A contains various components. Such components may be implemented using hardware, software, and/or firmware. The functions of various components may be performed based on instructions executed by general purpose processors. For instance, the functions of some components of display control system 200A may be performed by the components of computer system 800 of FIG. 8. Display control system 200A may include: data classification analysis engine 210, user interface environment 220, display analysis rules database 230, marker definition engine 240, public data display modification engine 250, private data display modification engine 260, public display interface 270, private display interface 280, and private display device feedback engine 285.

Data classification analysis engine 210 may receive information (e.g., text, video, graphics) to be displayed from user interface environment 220. User interface environment may comprise software being executed by display control system 200A. User interface environment may include an operating system 222 and/or one or more applications being executed, such as application 224. User interface environment may output visual information that is to be presented to one or more users. The visual information output by user interface environment 220 may or may not include tagged information. If tagged, pieces of visual information may be labeled as public or private. For instance, application 224 may assess information it outputs for privacy. Privacy as determined by application 224 may be based on how a developer of application 224 has labeled various categories of information that may be output for display by application 224 or user preferences, such as in display analysis rules database 230. For instance, whenever an account number is output for display by application 224, application 224 may label the account number as private. In other embodiments, an application may simply label all text output for display as private. Similarly, just as an application such as application 224 may label information to be displayed as public or private, operating system 222 may label information output for display by operating system 222 and/or may label information output by applications being executed through operating system 222 as either private or public.

In some embodiments, display control system 200A may receive information to be displayed from an external source. Rather than information to be displayed being generated by the user interface environment of display control system 200A, a separate computer system or other data source may be in communication with display control system 200A. Information received from this external source may be processed via user interface environment 220 and/or data classification analysis engine 210.

Data classification analysis engine 210 may identify whether information to be displayed should be categorized as public or private and/or may route data based on the privacy of the data. Data classification analysis engine 210 (and other components of display control system 200A) is illustrated as being operated outside of user interface environment 220. In some embodiments, it should be understood that data classification analysis engine 210 and/or other components of display control system 200A may be in the form of software executed via operating system 222. For instance, data classification analysis engine 210 may be a type of application. In other embodiments, such components may be implemented using firmware and/or specialized hardware.

If operating system 222 or application 224 has labeled data to be displayed as public or private, data classification analysis engine 210 may serve to properly route the public data and private data for display. Public data may be routed to public data display modification engine 250. In some embodiments, data for display received by data classification analysis engine 210 may not be labeled as either public or private. Data classification analysis engine 210 may analyze the data for display and determine whether the data should be classified as public or private. In some embodiments, text will be treated as private information while graphics will be treated as public information. Such a rule may be useful for a user desiring a high level of privacy. If a user is only desirable of a lower level of privacy, only numbers, email addresses, addresses, and passwords (for example) may be treated as private information. Data classification analysis engine 210 may use a set of rules to determine information that should be treated as public or private. Display analysis rules database 230 may contain rules that control whether information is presented to the user as public or private. Such rules may be at least partially defined by a user. In some embodiments, a user may select a level of privacy (e.g., high, medium, or low). In some embodiments, the user may define specific rules (e.g., all text output for display by an email program should be treated as private). The rules stored by display analysis rules database 230 may be application-specific or may be used for information output for display by multiple applications.

In some embodiments, the rules followed regarding which information is treated as public or private is based on location. For instance, if the user is determined to be viewing information in his office or home, it may be assumed that the user does not need to protect displayed information from casual onlookers. However, if a person is located at a public location, like a coffee shop or mall, a higher level of privacy may be enforced. In some embodiments, gaze detection may be used to determine if a person other than the user is attempting to look at the user's public display device. For instance, a camera that has a field-of-view of a scene where the public display device is visible may be used to determine if a person other than the user is looking at the user's public display device. If so, private information may be transitioned to being presented via a private display device to the user. In some embodiments, false information may be substituted for the private information to fool the person other than the user looking at the public display device.

Marker definition engine 240 may define a marker (e.g., reference, anchor, fiduciary) for displaying the private information by the private display device in relation to the public information displayed by the public display device. For example, if a user is using an HMD as the private display device, the private information displayed to the user may be desired to be presented in the user's field of vision such that the private data appears to the user as displayed anchored with the public information displayed by the public display device. Therefore, as the user's head moves, the private information may need to be repositioned by the private display device such that the user has the impression of the private information remaining in a same location relative to the public information displayed by the public display device.

In order for the private display device to properly position the private information for display in relation to the public information displayed by the public display device, a marker from among the public information being displayed may be defined. The marker may be a visual pattern that can be recognized by the private display device from among the public information presented by the public display device. Techniques for locating a defined marker are known to those with skill in the art and for brevity are not detailed herein. Marker definition engine 240 may use public information being displayed by the public display device to be used as the marker. Therefore, marker definition engine 240 may access public information being output for display by public display interface 270 to determine what public information is to be used as a marker. As the public information output for display by public display interface 270 changes, the public information used as the marker may need to be modified. Further, marker definition engine 240 may define vector data that indicates where private data should be displayed in relation to the defined marker. As such, the vector data may indicate a direction and the distance for the private information to be presented relative to the marker. Such vector data may also be in the form of coordinates or some other form of location information. Marker and vector data defined by marker definition engine 240 may be routed to the private display device of one or more users via private display interface 280. This marker and vector data may be used to position private data received by the private display device for display.

Marker definition engine 240 may be able to determine whether a dedicated marker should be defined, such as based on input from private display device feedback engine 285. If a dedicated marker is to be defined, marker definition engine 240 may render and output a marker for display to public data display modification engine 250 for display by the public display device. Marker definition engine 240 may have access to a predefined dedicated marker that marker definition engine 240 can resize and/or position as displayed by the public display device. In some instances, marker definition engine 240 may have access to a library of multiple predefined markers that can be used as dedicated markers. These dedicated markers may be specialized for particular situations. For instance, a high-contrast marker may be used when ambient lighting is likely to be interfering with a private display device locating a marker. If information to be presented to persons and/or users via public display interface is to be used as a non-dedicated marker, marker definition engine 240 may analyze such public information from public display interface 270 to select public information that will serve as a sufficient marker. When a non-dedicated marker is to be used by marker definition engine 240, marker definition engine 240 may select public information based on parameters such as: contrast, size, and uniqueness (as compared to other displayed public information).

The definition of markers by marker definition engine 240 may be dynamic. Therefore, even if the public information output by public display interface 270 does not change, marker definition engine 240 may modify the portion of the public information being used as the marker for one or more private display devices. The marker definition engine 240 may also cause a dedicated marker to be displayed among the public information even if the other displayed public information has not changed.

Data that is to be displayed privately to the user may be routed to private data display modification engine 260 by data classification analysis engine 210. Data that is to be displayed publicly to the user may be routed by data classification analysis engine 210 to public data display modification engine 250. Information related to the private data to be displayed may also be routed to marker definition engine 240.

Both public information and private information to be presented by their respective display devices may need to be modified for display by the respective display device. For instance, the resolution of a private display device may be different from the resolution of the public display device. Private data display modification engine 260 may receive private information to be presented by the private display device. Private data display modification engine 260 may modify the private information to be more effectively presented by the private display device. This may include adjusting the contrast, brightness, size, and/or resolution of the private information. Similarly, public data display modification engine 250 may receive public information to be presented by the public display device. Public data display modification engine 250 may modify the public information to be more effectively presented by the public display device and to facilitate display of the private information. This may include adjusting the contrast, brightness, size, and/or resolution of the private information. Further, modification may include the insertion of a dedicated marker. Modification may include adjusting brightness and/or contrast to make a marker easier to locate. Public information to be presented behind private information may be modified to facilitate display of the private information. For example, a graphic to be displayed behind private text may be decreased in brightness to allow the text to be more visible against the graphic background. As an example, consider the background graphic of a body section of an email in relation to the text of the email, which may be treated as private information. By decreasing the brightness of at least portions of the public information to be presented, the brightness output by the private display device required for visibility of private information may be decreased, thus possibly resulting in power savings. Further, if false information is to be displayed by the public display device, public data display modification engine 250 may create and/or access false information to be presented in a location which will be overlaid with the (real) private information for the user. As such, this false information may be visible to persons other than the user, but the display of the private information may obscure the false information presented by the public display device. For example, in the example of a financial account number, the false information may be a random number of the same number of digits.

Private display interface 280 may serve to interface with the private display device of one or more users. For instance, private display interface 280 may serve to interface with the private display device. Private display interface 280 may cause wireless (or wired) transmission of the private data to be displayed, the marker, and associated vector data to the private display device of the one or more users. Such data may be encrypted. Similarly, public display interface 270 may serve to interface with the public display device being viewed by the user (and, possibly, one or more other persons). Public display interface 270 may output the public information to be displayed by the public display device including the public information that is to be used as the marker for positioning the private information. The public display device may be in wired or wireless communication with public display interface 270. When viewed by the user, private information may be overlaid in the user's field-of-view over at least some of the private information. As such, to the user, it may appear that the public display device is presenting all of the information. However, to another person in the area, the private information being presented to the user via the private display device is not visible, thereby protecting the private information being viewed by the user.

Further, private display interface 280 may receive feedback from one or more private display devices. Such feedback may indicate whether or not a marker identified to the private display device could be located. The information may also indicate a likely reason as to why the marker could not be located. In some instances, the feedback processed by private display device feedback engine 285 may be based on user input that indicates that the marker is insufficient or, more specifically, the presence of an obstacle, high ambient lighting, etc. Private display device feedback engine 285 may process such received feedback. Based on the feedback, one or more different markers (each having one or more different display characteristics from the unlocated/untrackable marker) may be defined by marker definition engine 240. The different marker may be indicated to the private display device along with coordinates or vector information sufficient to position the private information for presentation.

Figure 2B:
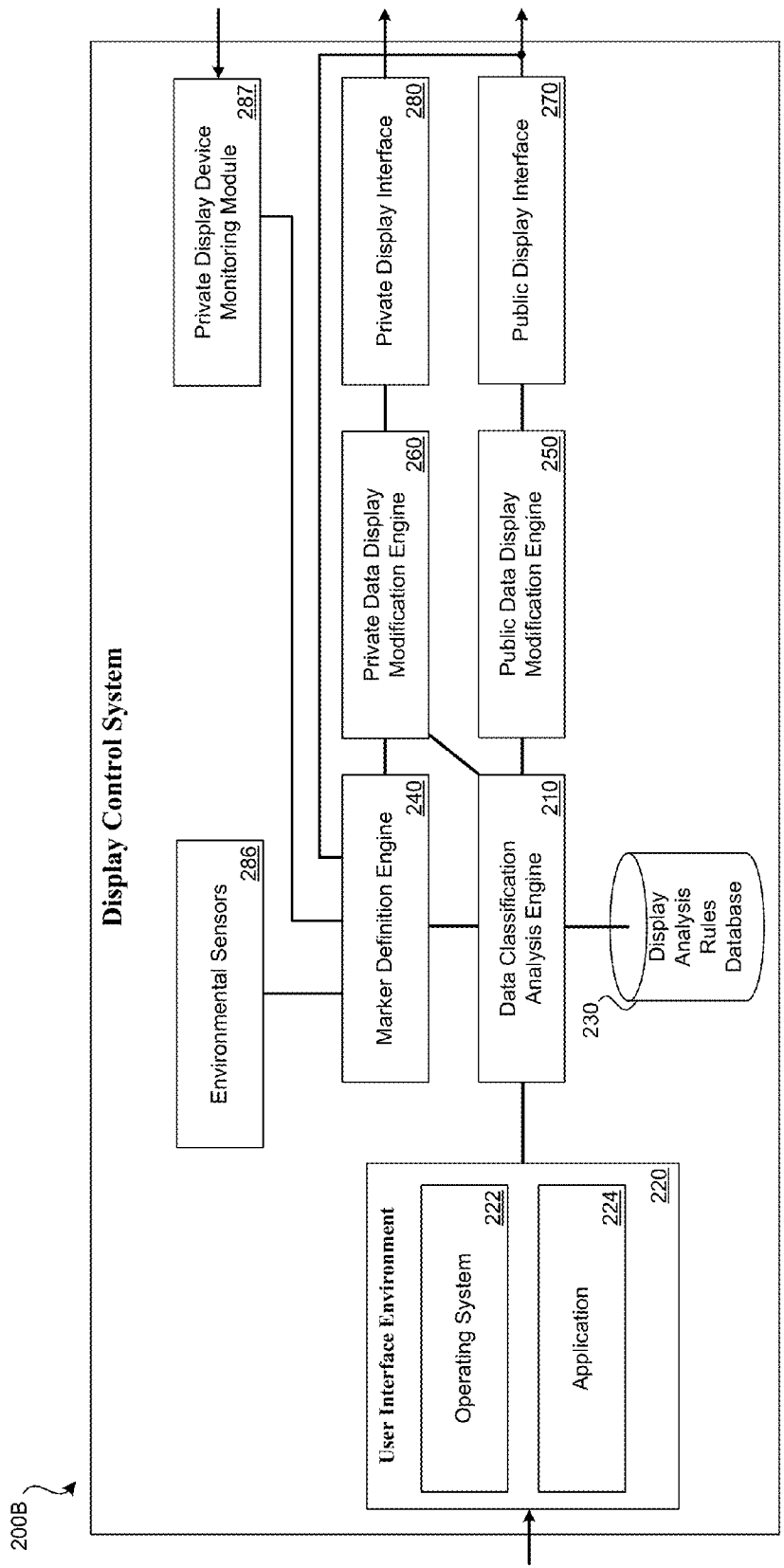
FIG. 2B illustrates another embodiment of a display control system for defining a marker for presentation by a public display device.

FIG. 2B illustrates an embodiment of a display control system 200B for defining a marker for presentation by a public display device. In embodiment 200B, the majority of the components may function similarly to as previously described in relation to display control system 200A of FIG. 2A. However, rather than receiving feedback from one or more private display devices, display control system 200B may monitor the ambient environment of the display control system, the public display device, and/or the one or more private display devices to determine whether a marker is sufficient.

Rather than receiving feedback from one or more private display devices, display control system 200B may have one or more environmental sensors 286. An environmental sensor may be positioned so as to monitor ambient conditions: near the public display device, near one or more private display devices, and/or near display control system 200B. An environmental sensor may measure an amount of ambient lighting. The greater the amount of ambient lighting, the more difficult a marker may be to detect for a private display device. An environmental sensor may measure a brightness of the public display device. The brighter the public display device, the easier it may be for a marker to be detected by a private display device.

In addition to information from environmental sensor(s) 286, marker definition engine 240 may have access to additional environmental information, such as the size of the room (a bigger room may be more likely to have a private display device a greater distance from the public display device than a smaller room) and the size of the public display device (which may result in markers being displayed smaller).

Private display device monitoring module 287 may determine a distance between one or more private display devices and the public display device. For instance, private display device monitoring module 287 may include one or more cameras that are used to estimate the distance to the public display device and/or one or more private display devices. The greater the distance between one or more of the private display devices and the public display device, the larger the marker defined by marker definition engine 240 may be in order to increase the likelihood that the marker can be located by the private display device. Determining the size of the marker may also factor in the size of the public display device and the resolution of the sensor of the one or more private display devices.

Private display device monitoring module 287 may also be used to determine if there is likely an obstruction between a private display device and the public display device. By analyzing the line of sight between the private display device and the public display device, private display device monitoring module 287 may determine that marker definition engine 240 should define a different marker that is more likely to be able to be located by the private display device. For instance, a marker located higher on the public display device may be less likely to be obstructed to a private display device.

Figure 3:
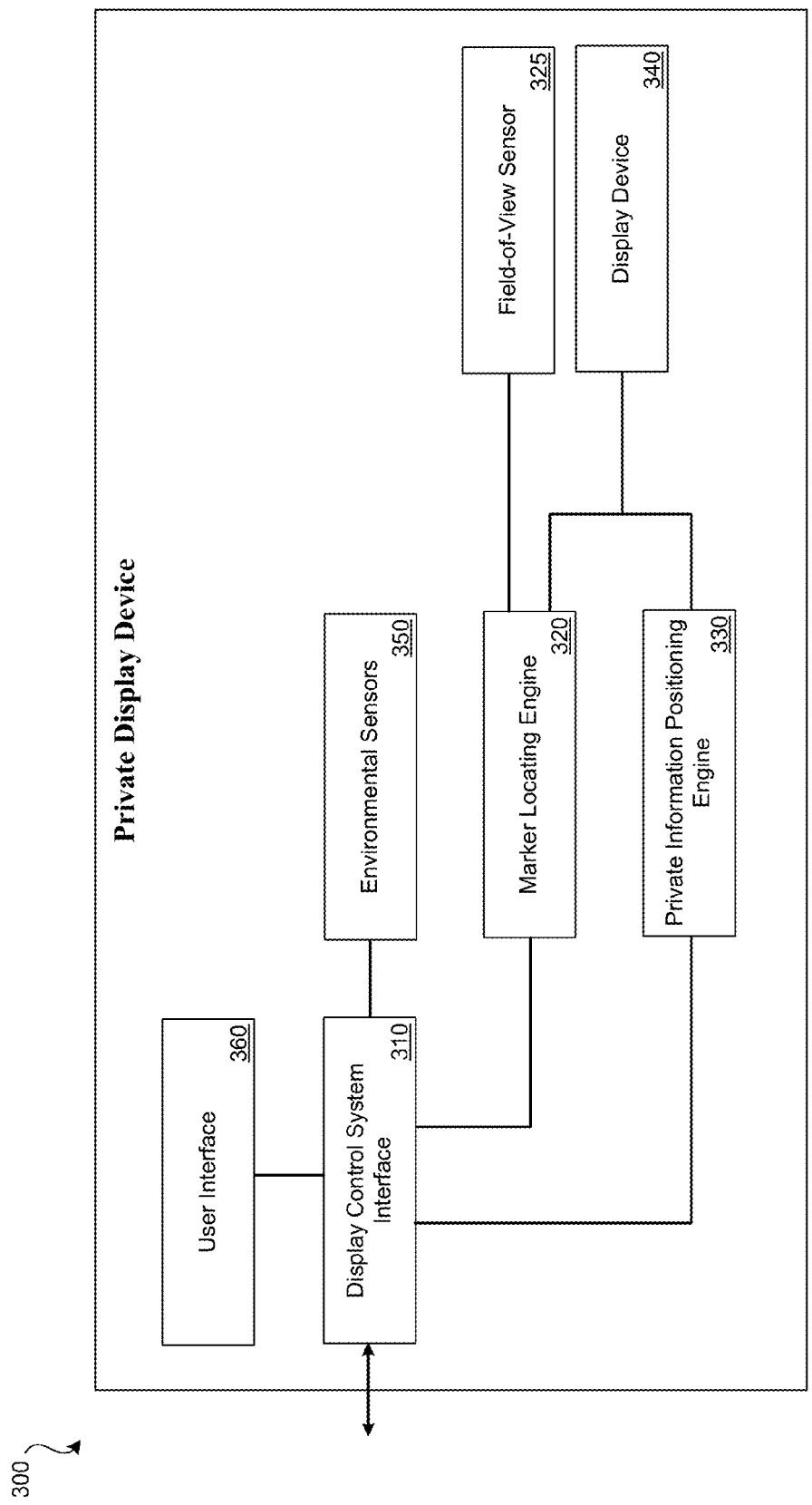
FIG. 3 illustrates an embodiment of a private display device configured to locate markers and possibly provide feedback on a number presented by a public display device.

FIG. 3 illustrates an embodiment of a private display device 300 configured to locate markers. Private display device 300 may also be configured to provide feedback on markers. Private display device 300 may be an HMD. Private display device 300 may represent one or more of private display devices 130 of FIGS. 1A and 1B. Private display device 300 of FIG. 3 contains various components. Such components may be implemented using hardware, software, and/or firmware. The functions of some of the components may be performed based on instructions executed by general purpose processors. For instance, the functions of some components of private display device 300 may be performed by the components of computer system 800 of FIG. 8. Private display device 300 may include: display control system interface 310, marker locating engine 320, field-of-view sensor 325, private information positioning engine 330, display device 340, environmental sensors 350, and user interface 360.

Display control system interface 310 may be configured to receive private information, markers, and vector or coordinate information from a display control system, such as display control systems 200A and 200B of FIGS. 2A and 2B, respectively. Display control system interface 310 may communicate with a display control system via a wired or wireless interface. An indication of a marker received may be routed to marker locating engine 320.

Marker locating engine 320 may receive information from field-of-view sensor 325. Field-of-view sensor 325 may include one or more cameras or other form of imaging devices that capture images of a scene which the user is facing. As an example, a user wearing private display device 300 may be looking at a conference room. Field-of-view sensors 325 may capture images of at least a portion of the user's view of the conference room. Images from field-of-view sensor 325 may be used by marker locating engine 320 to assess the relative size of a public display device. If the public display device appears small (due to a distance from the public display device and/or the public display device being small in size (e.g., a laptop screen)), feedback may be provided to the display control system via display control system interface 310 that indicates the marker should be increased in size. The feedback may also indicate the relative size of the public display device.

Field-of-view sensor 325 may include a depth-of-field sensor. The depth-of-field sensor may be configured to determine a distance from private display device 300 to the public display device presenting a marker. This distance measurement (possibly in conjunction with a measurement of the size of the public display device) may be used to provide feedback to the display control system via display control system interface 310 to indicate whether the marker needs to be modified. For example, feedback may indicate that the marker should be made larger or that the private display device can tolerate a smaller marker.

By analyzing images captured by field-of-view sensor 325, marker locating engine 320 may attempt to locate the marker indicated by display control system interface 310. If the marker is located, marker locating engine 320 may communicate the location of the marker to private information positioning engine 330. If the marker cannot be located by marker locating engine 320, feedback may be provided by marker locating engine 320 to display control system interface 310 for communication to the display control system. Such feedback may result in a new marker being defined and indicated to display control system interface 310.

Private information positioning engine 330 may receive a location of a marker from marker locating engine 320. Based upon coordinates, vectors, or other positioning information, private information positioning engine 330 may position private information for display by private display device 300 relative to the location of the marker. The private information along with the location for display may be provided to display device 340. Display device 340 may allow a user to view a scene while simultaneously viewing private information presented by display device 340. Therefore, private information presented by display device 340 may be superimposed or overlaid onto a scene by display device 340. Such private information may be semi-transparent or opaque.

Environmental sensors 350 may include one or more sensors that gather ambient environmental data for feedback to the display control system. For example, an environmental sensor may gather information about ambient lighting. The greater the amount of ambient lighting, the more difficult a marker may be to detect for a private display device. An environmental sensor may measure a brightness of the public display device. The brighter the public display device, the easier it may be for a marker to be detected by private display device 300. Environmental sensors 350 may be used to complement or instead of environmental sensors 286 of FIG. 2B. Feedback from environmental sensors 350 may be provided to the display control system for use in defining future markers.

User interface 360 may be used by the user of private display device 300 to provide feedback. Such feedback may be used to indicate when the private information is or is not being presented properly. For instance, if marker locating engine 320 erroneously locates the marker, the private information may be displayed in the wrong location. The user may provide feedback via user interface 360 to indicate that the presentation of the private information is incorrect. This feedback may result in a new marker being defined.

User interface 360 may also be useful for a user to provide feedback indicative of the view of the marker likely being blocked (such as when the user can only view a portion of the public display device) or otherwise unusable. For instance, if the user is in a crowd of people, other persons' heads may obscure a view of the marker. Such feedback may result in a different marker being defined or the marker being moved. The user interface 360 may include one or more buttons, which may be located on an input device (e.g., a wristband) or directly on the private display device. Gestures, eye movements, or other forms of input may also be used to provide user input to user interface 360.

Figure 4A:
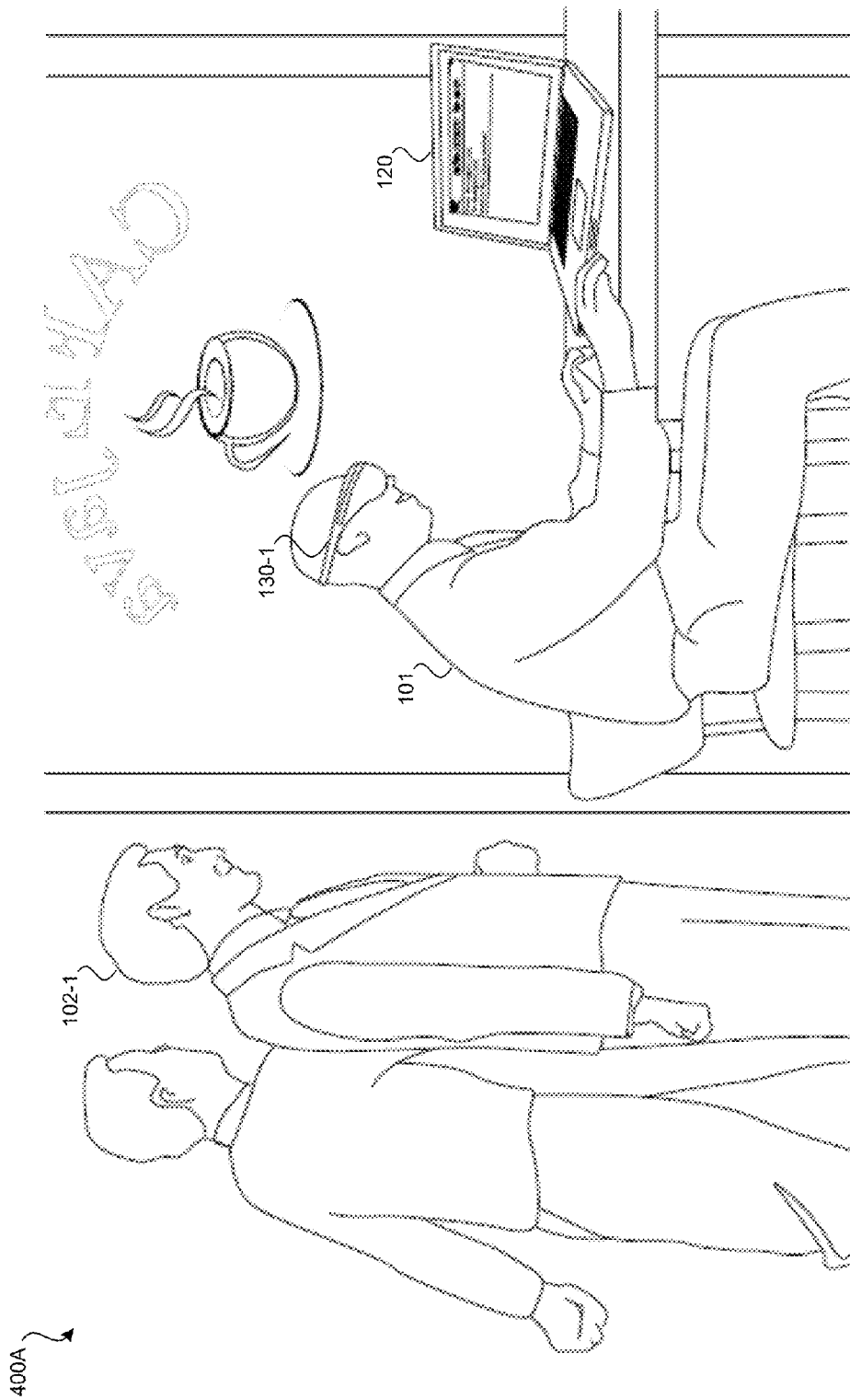
FIG. 4A illustrates an embodiment of a scene in which a user is viewing private information in conjunction with public information.

FIG. 4A illustrates an embodiment of a scene 400A in which a user is viewing private information via a private display device in conjunction with a public display device. Scene 400A may be an implementation of system 100A of FIG. 1A. In the illustrated embodiment, the display control system (e.g., display control system 200A or 200B) may be the user's laptop, with the screen of the laptop functioning as public display device 120. In scene 400A, user 101 is sitting in a coffee shop using his laptop. The user's laptop has a display screen functioning as public display device 120 and the user is using private display device 130-1, which displays private information visible to only user 101. In the illustrated embodiment, private display device 130-1 is an HMD. In scene 400A, person 102-1 is attempting to see what is on public display device 120 of the user's laptop. User 101 may or may not be aware that person 102-1 is attempting to see the information being presented by the public display device 120 of the user's laptop.

Figure 4B:
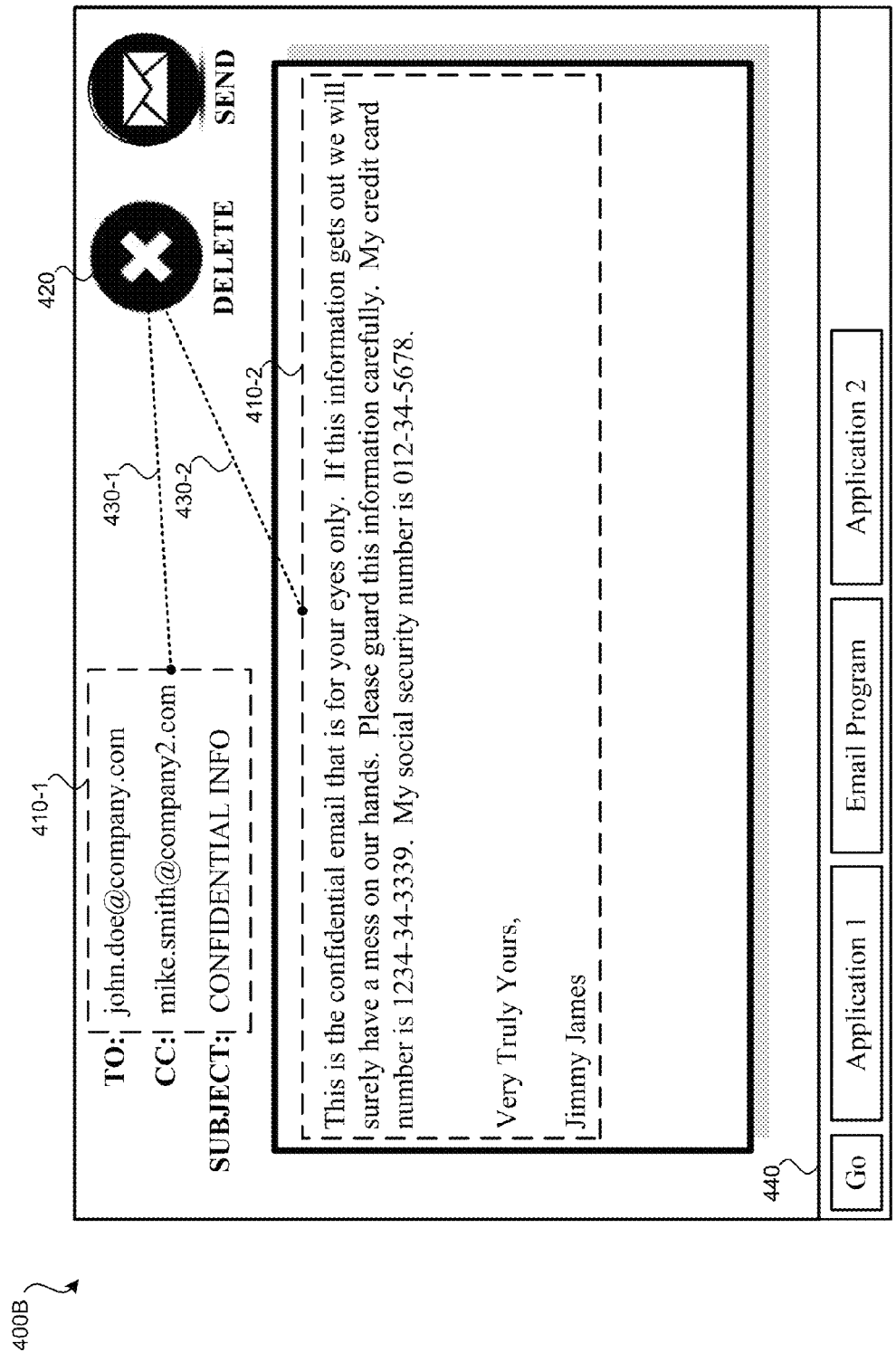
FIG. 4B illustrates an embodiment of a marker being defined among public information presented by a public display device.

In the illustrated scene 400A, user 101 is composing an e-mail. This e-mail may contain sensitive materials that user 101 desires to keep confidential. While the user is located in a public location which may have persons, such as person 102-1, attempting to view the user's laptop, the user may be able to maintain privacy by having only public information be presented via public display device 120. Private information, such as the text of the e-mail that user 101 is composing, may be presented to user 101 via private display device 130-1. Therefore, person 102-1 and any other person attempting to view public display device 120 may not see any information that may be private to user 101. However, user 101 may view the private information via private display device 130-1. Further, the private information may appear to be displayed by public display device 120 to user 101 on public display device 120 because private display device 130-1 overlays (or superimposes) the private information on public display device 120. For instance, FIG. 4B represents what user 101 may see when looking at public display device 120 through private display device 130-1. To be clear, a private display device, such as an HMD, can display text and/or graphics on a transparent surface, thus allowing a user to directly view real-world objects through the HMD.

For the embodiment of FIG. 4A to function properly, private display device 130-1 may need a marker to be identified. Private display device 130-1 may present the private information relative to the location of the detected marker. The marker may be presented by public display device 120. FIG. 4B illustrates an embodiment of a marker being defined among public information presented by a public display device. Embodiment 400B may represent the view of user 101 of FIG. 4A while looking at public display device 120. In embodiment 400B, the majority of the information presented may be considered public information. For instance, the sending and delete graphics in the upper right, the background box for the e-mails body text, and application bar 440 may each be pieces of public information presented by the public display device that are viewed directly from public display device 120 by user 101.

However, text 410-1, which represents e-mail recipients and the subject of the e-mail, and text 410-2, which is the body text of the email, may be treated as private information. Such private information may be presented to user 101 via a private display device, such as private display device 130-1 of FIG. 4A. Private information, such as texts 410 may be superimposed on the public information presented by public display device 120. As such, to user 101, the presentation of the public and private information may have the appearance of being presented by a single display device, while protecting private information from viewing by other persons such as person 102-1.

In order for private display device 130-1 to properly position text 410 over public display device 120, private display device 130-1 may require to be notified of a marker that is displayed by public display device 120 and vector data for where the private information should be presented in relation to the marker. A marker definition engine, such as marker definition engine 240 of FIGS. 2A and 2B, may select some or all of the graphic (or other presented information) for use as a marker. Graphic 420, defined as the marker, may be located by a field-of-view sensor of private display device 130-1 which is aimed in the direction of the user's field-of-vision. Vector data may also be transmitted to private display device 130-1 and may indicate where private information should be positioned for display by private display device 130-1 relative to graphic 420. For example, vector data may indicate a direction and distance, indicated by line 430-1, to present text 410-1. A different vector which indicates a different distance and direction, indicated by line 430-2, may indicate where text 410-2 is to be displayed in relation to graphic 420 being used as the marker.

In the illustrated embodiment of 400B, the display control system has selected graphic 420 from among the public information being presented to the user via the public display device for use as a marker. As such, private display device 130-1 receives an indication of this marker and attempts to locate the marker. Graphic 420 may have been selected as the marker because of its size, contrast, and/or uniqueness as compared to other presented information on the public display device. Graphic 420 is a non-dedicated marker. A "non-dedicated marker" is a marker that has another purpose besides serving as a marker. For instance, graphic 420 is an icon that a user can interact with to delete the draft email. A non-dedicated marker may be preferable as compared to a dedicated marker so as not to require use of a portion of the public display device for display of a dedicated marker. A "dedicated marker" is intended to serve only as a marker.

If the public information presented by public display device 120 is altered such that graphic 420 is no longer displayed (or is moved), different information presented by public display device 120 may be selected to serve as a marker; private display device 130-1 may be notified of the new marker and new vector data for use in positioning the same or different private information to be displayed by private display device 130-1.

Figure 4C:
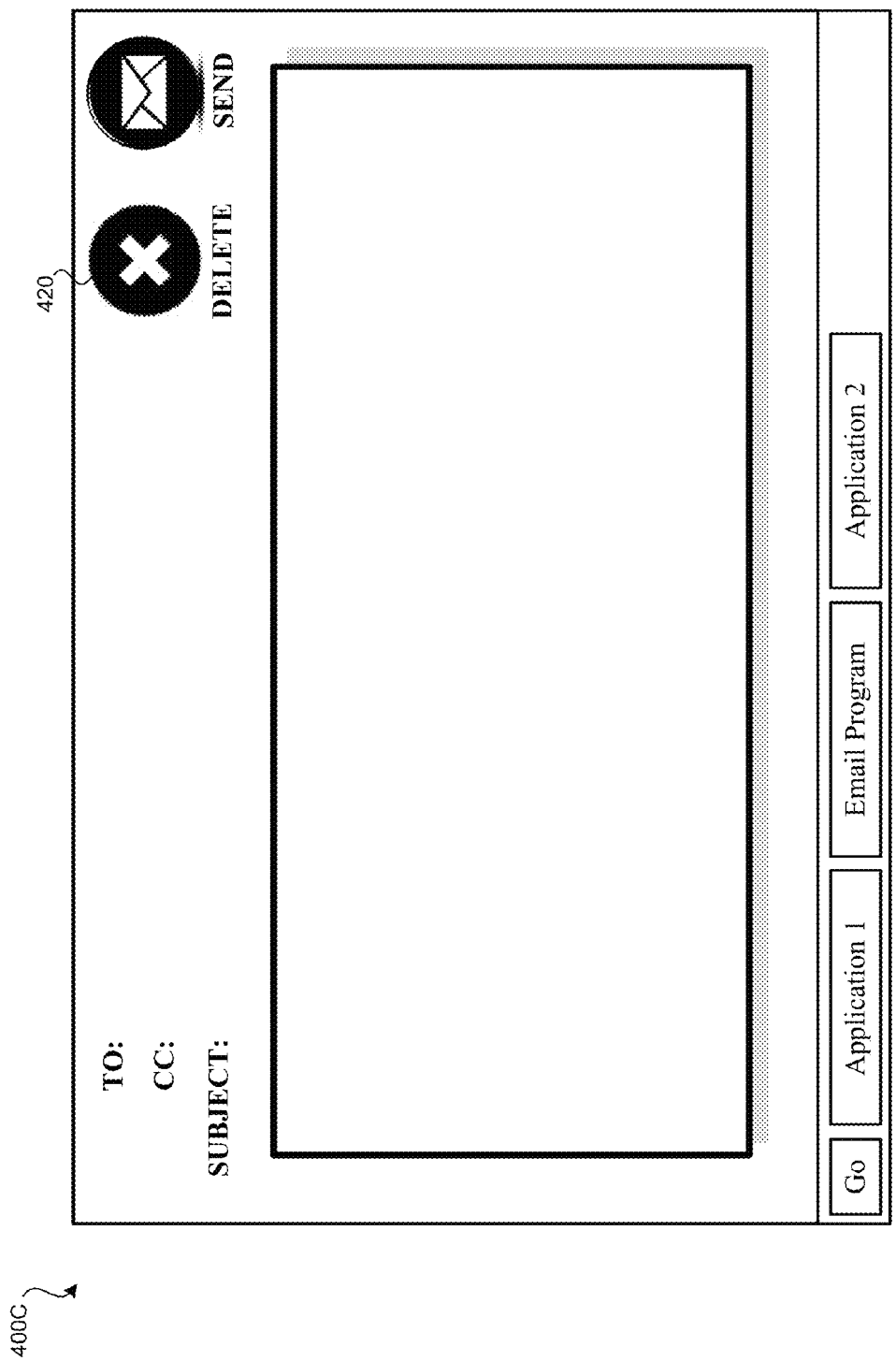
FIG. 4C illustrates another embodiment of a marker being defined among public information presented by a public display device.

FIG. 4C illustrates an embodiment 400C of how embodiment 400B may appear when viewed by a person not wearing private display device 130-1. Embodiment 400C may represent the view of person 102-1 of FIG. 3A while looking at public display device 120. In embodiment 400C, person 102-1 may be able to view all of the public information, but not the private information. Therefore, person 102-1 may not see the private information of user 101. Graphic 420, which is being used as the marker, is displayed by public display device.

Figure 4D:
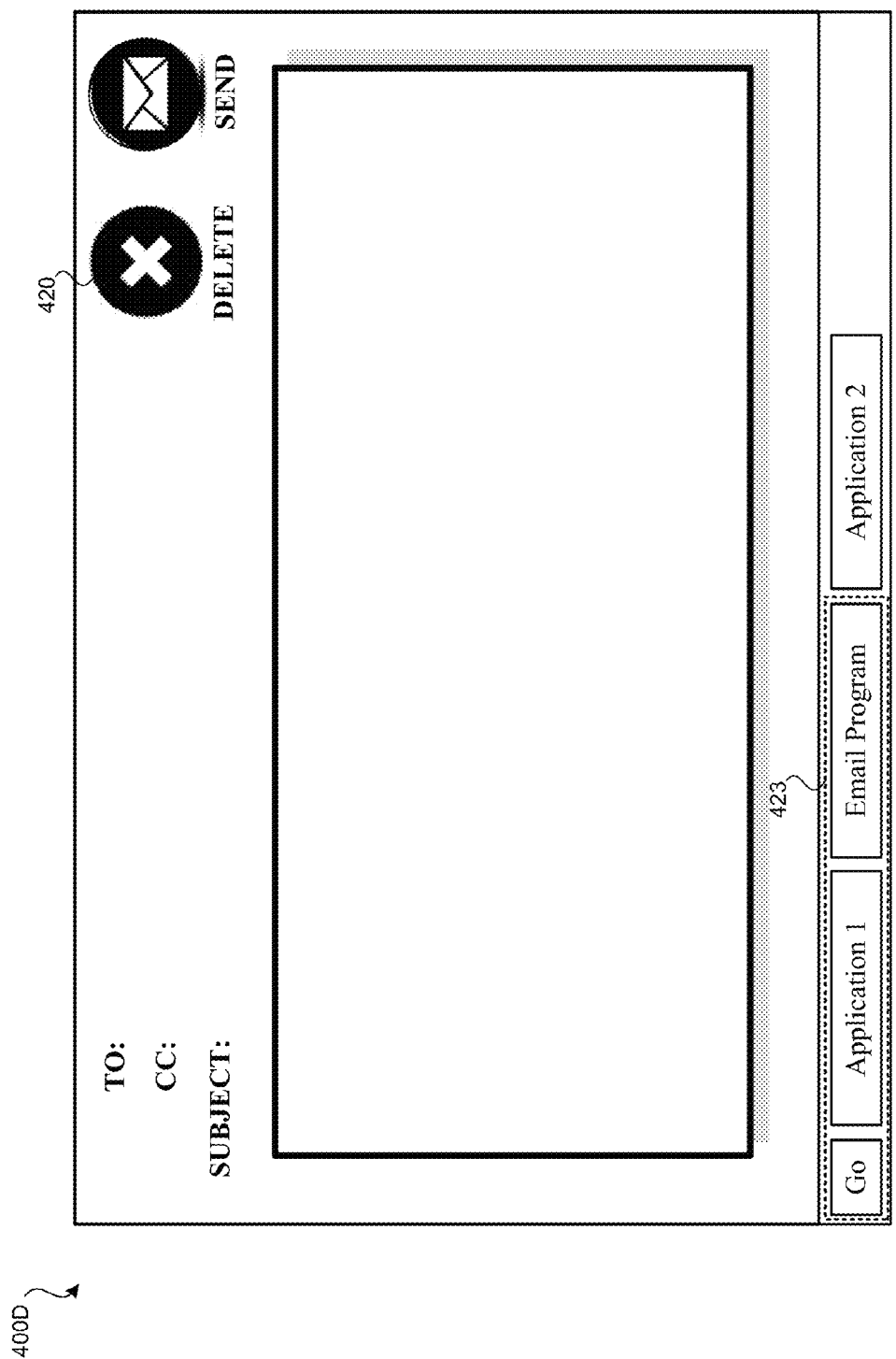
FIG. 4D illustrates another embodiment of a marker being defined among public information presented by a public display device.

FIG. 4D illustrates an embodiment 400D in which different public information is being used as the marker. In embodiment 400D, a different non-dedicated marker is being used as compared to embodiments 400B and 400C. Embodiment 400D may be implemented if graphic 420 is not functioning as a proper marker for any reason. In some embodiments, graphic 420 may no longer be used as the marker because the user has provided input indicating that the private information is not being presented properly. In embodiment 400D, a portion of a taskbar 423 is serving as the marker. Again here, the marker is being presented by the public display device. In indication of the portion of the taskbar 423 that is being used the marker may be provided to the private display device being used by the user. Different coordinate, vector, or other positioning information may also be transmitted to the private display device such that private information may be properly positioned in relation to the portion of the taskbar 423. While a different marker and different positioning information may be provided to the private display device, the location of the private information presented and the private information presented may be unchanged. For instance, if the private display device is having difficulty locating or tracking a marker, such as graphic 420, the marker and positioning information used may be changed such that the portion of the taskbar 423 is used as a marker for positioning the private information without the user being made aware of the change.

In embodiments 400C and 400D, two examples of markers are presented. It should be understood that these markers are for example purposes only; other information presented by the public display device may be used as the marker. In some embodiments, more than one marker may be used. Further, the exemplary embodiments of an e-mail are merely intended to be illustrative; other embodiments may vary.

Figure 4E:
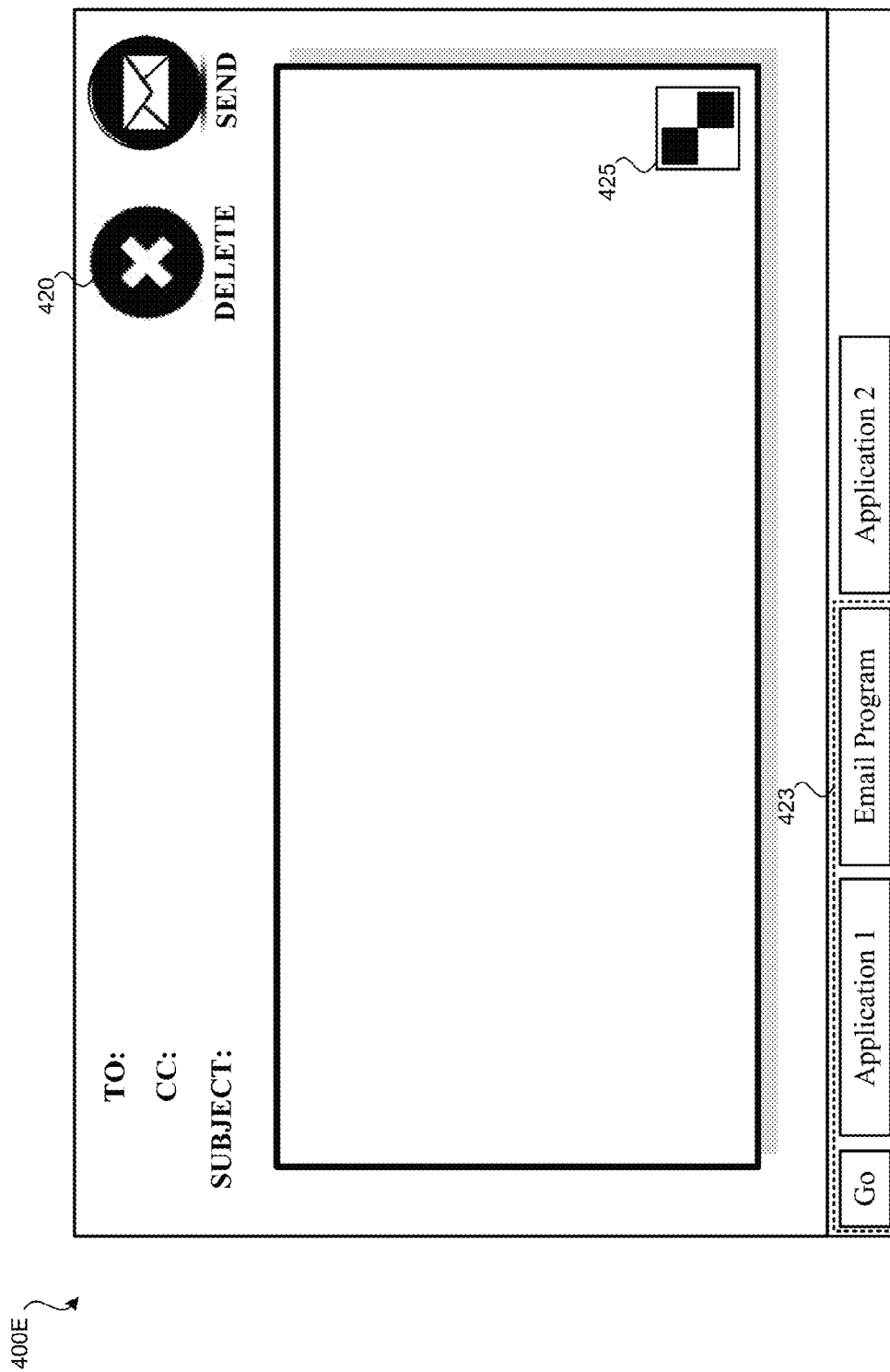
FIG. 4E illustrates an embodiment of a dedicated marker being defined among public information presented by a public display device.

FIG. 4E illustrates an embodiment 400E in which different public information is being used as the marker. In embodiment 400E, rather than using a non-dedicated marker, a dedicated marker is presented by the public display device. In certain situations, a dedicated marker may be easier for a private display device to locate and track as compared to a non-dedicated marker. For instance, a dedicated marker may be designed to be high contrast, be unique as compared to other information presented by the public display device (and real-world background objects), and generally be easy for the private display device to locate and track. Dedicated marker 425 is an example of such a dedicated marker. The graphical layout and size of dedicated marker 425 is intended to be exemplary. In some embodiments, a dedicated marker, such as dedicated marker 425 may be used in situations where the private display devices have previously had difficulty locating and/or tracking non-dedicated markers, such as graphic 420 and portion of the taskbar 423. For example, two different non-dedicated markers may be attempted to be used before displaying a dedicated marker for use in positioning private information by the private display device. Therefore, a dedicated marker, such as dedicated marker 425, may only be presented via the public display device when the dedicated marker is needed to be used for positioning private data.

Dedicated marker 425 may be positioned such that it is unobtrusive to the use of the public display device by the user. As such, dedicated marker 425 may be positioned such that it is located in a blank spot of the public display device and/or may be located to an extreme edge of the public display device. In some embodiments, dedicated marker 425 may only be presented for a period of time to allow the private display device to locate dedicated marker 425. Tracking, which may be a less intensive process for the private display device, may be performed using another non-dedicated marker, thus allowing the dedicated marker to no longer be presented by the public display device. Further, it may be possible for the private display device to present information superimposed over dedicated marker 425. As such, even though a public display device may present a dedicated marker, such as dedicated marker 425, the user may not view the dedicated marker or the dedicated marker may be partially hidden to the user by information presented by the private display device. In some embodiments, such information may be a blanking graphic to hide the dedicated marker from the user of the private display device.

Figure 5A:
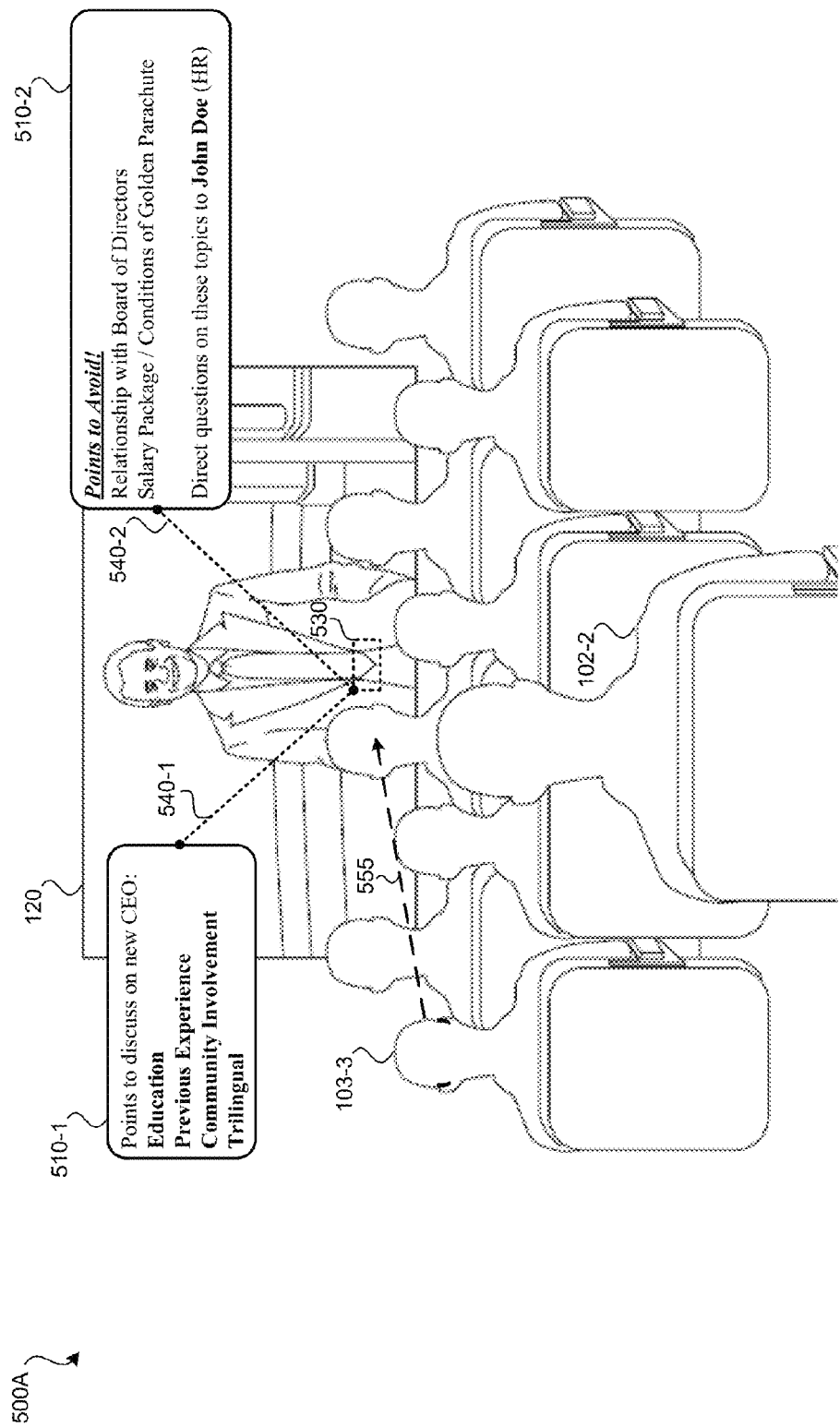
FIG. 5A illustrates an embodiment of a scene in which multiple users are viewing private information in conjunction with a single public display.
Figure 5B:
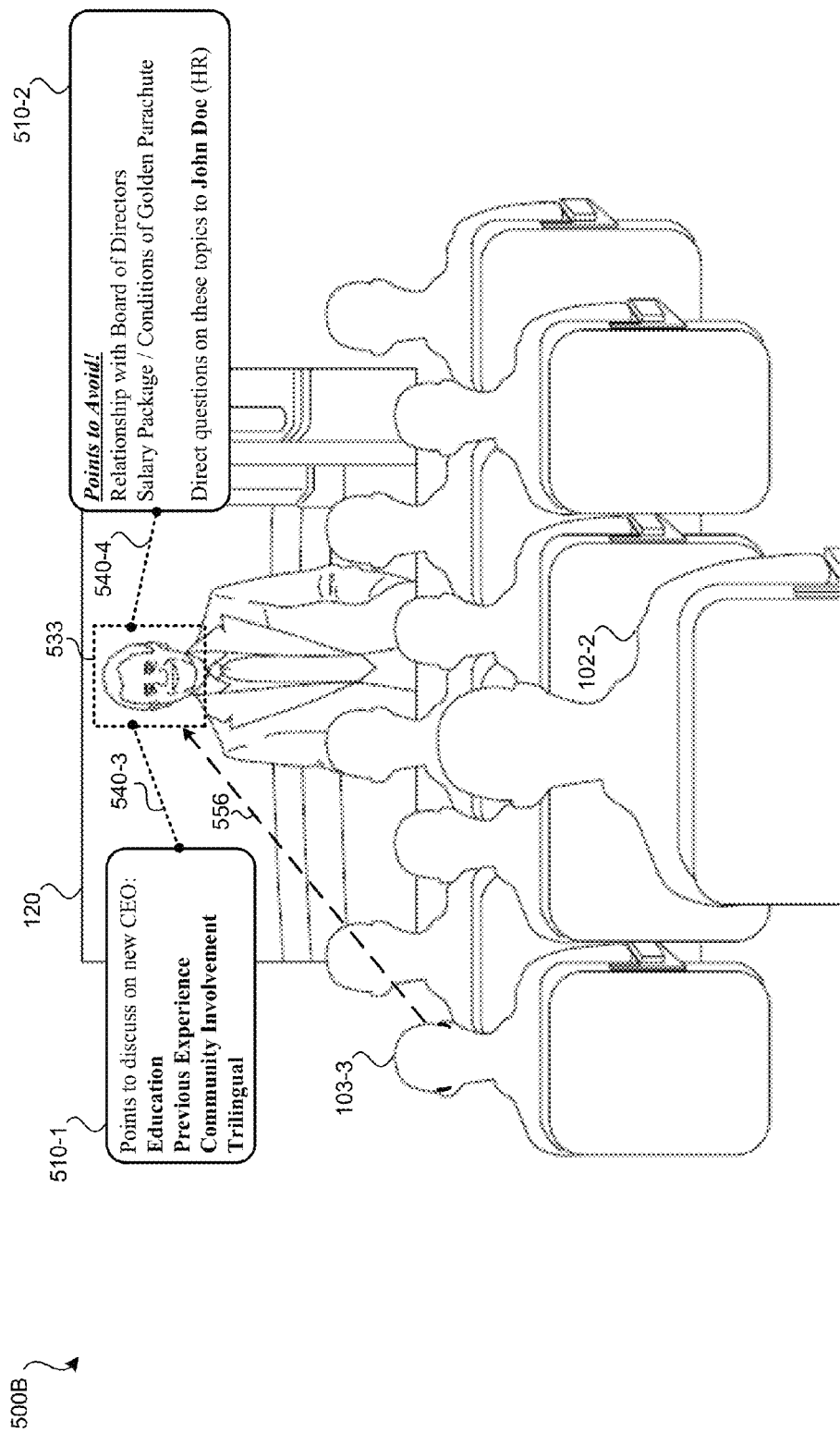
FIG. 5B illustrates an embodiment of a marker being defined among public information presented by a public display device.
Figure 5C:
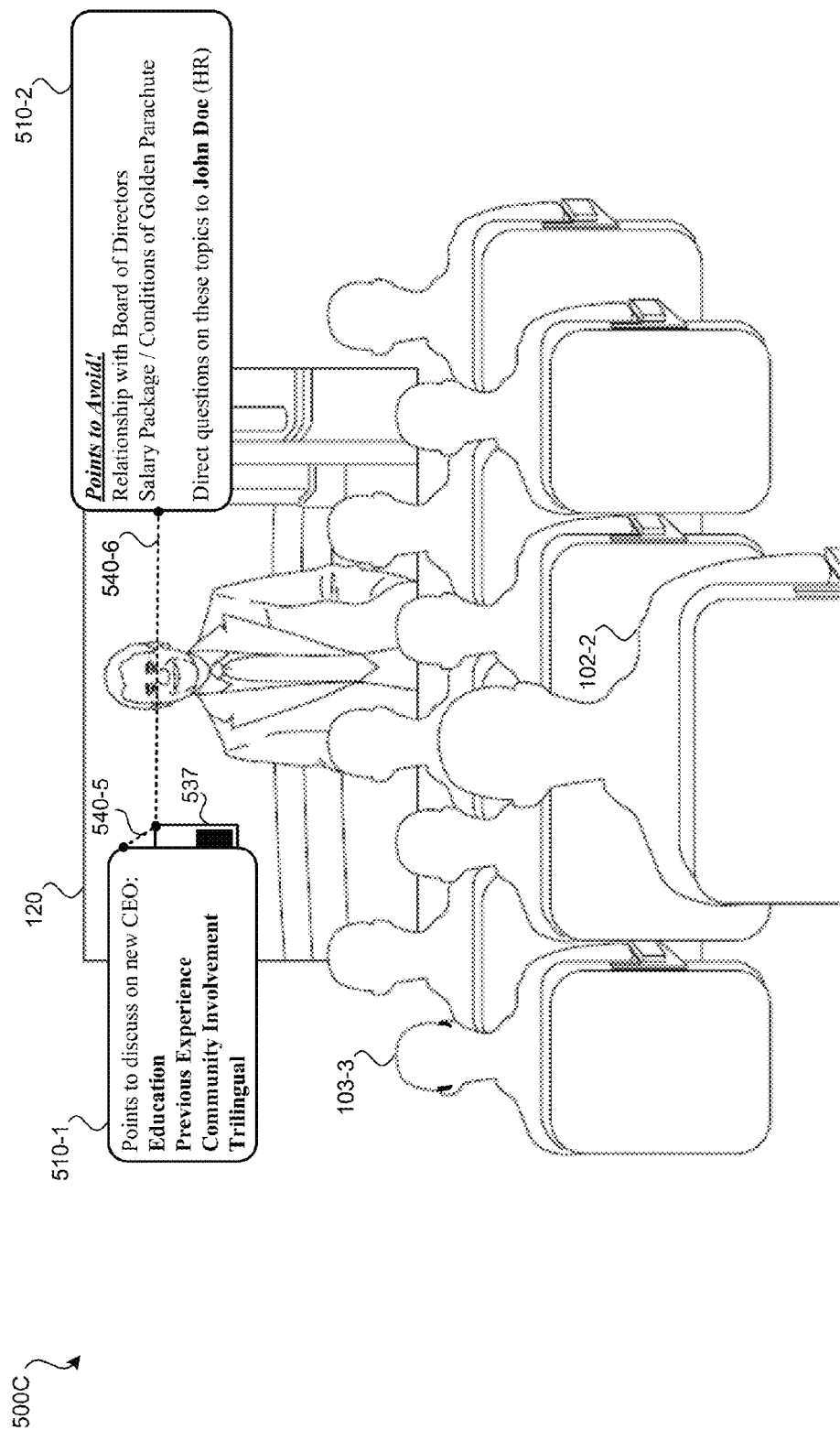
FIG. 5C illustrates another embodiment of a marker being defined among public information presented by a public display device.

FIGS. 4A-4E focus on embodiments involving a single user using a single private display device and a public display device. Embodiments may be present, such as in accordance with system 100B of FIG. 1B, where multiple users are present who are each using a separate private display device. Each of these users may be viewing the same or different private information via their respective private display devices. Further, these private display devices may use the same marker or different markers displayed by the public display device. FIGS. 5A-5C represent such embodiments.

FIG. 5A illustrates an embodiment 500A of a scene in which multiple users are each viewing private information via private display devices. Embodiment 500A may be an implementation of system 100B of FIG. 1B. Embodiment 500A presents a scene from the point of view of a user, such as user 103-2 of FIG. 1B. As such, user 103-2 may be sitting (or standing) in the back of a conference room where a presentation is being given. For instance, while persons, such as person 102-2, are viewing the presentation slides presented by public display device 120, user 103-2 may be addressing the crowd about the presentation.

While user 103-2 is viewing public display device 120, private information may be (possibly partially) overlaid on public display device 120. In some embodiments, private information may be presented in relation to, but may not be overlaying (either partially or fully), public display device 120, such as to the side of public display device 120. Person 102-2, who is either not wearing a private display device or is not wearing a private display device having the proper permissions, cannot view text 410, which is private information. Private information 510 is presented to user 103-2 via a private display device (such as private display device 130-2 of FIG. 1B) that user 103-2 is wearing. In the illustrated example, private information 510 serves to alert user 103-2 of various topics to discuss while the picture of the new CEO is displayed and also topics to avoid.

User 103-3 may also be present and may be wearing a private display device, such as private display device 130-3, as shown in FIG. 1B. Depending on the permissions associated with user 103-3, user 103-3 may be presented the same private information 510 as user 103-2. Alternatively, based on the user permissions of user 103-3, user 103-3 may be presented only private information 510-1 or some other private information. In yet another embodiment, user 103-3 may be presented entirely different private information based on the permissions of user 103-3.

In order for the private display devices used by users 103-2 and 103-3 to properly position text 410-1 (and text 410-2 for user 103-2) in relation to the public information presented by public display device 120, each private display device may receive an indication of one or more markers that are displayed by public display device 120 and vector data (or some other form of positioning data) for where the private information should be presented in relation to the one or more markers. A marker definition engine, such as marker definition engine 240 of FIG. 2, may select a portion of the public information presented by public display device 120 as the marker. Graphic 530 presented by public display device 120 may serve as a non-dedicated marker and may be located by field-of-view sensors of the private display devices which are aimed in the direction of the field-of-view of users 103-3 and 103-2. Vector data (or some other form of positioning data) may be provided to private display device 130-1 and may indicate where private information should be positioned for display by the private display devices in relation to one or more markers. For example, positioning vector data may indicate a direction and distance, indicated by dotted line 540-1, to present private information 510-1. Other positioning data that indicates a different distance and direction, indicated by dotted line 540-2, may indicate where private information 510-2 is to be displayed in relation to graphic 530 that is serving as the marker. If the public information presented by public display device 120 is altered such that graphic 530 is no longer displayed or used as the marker, a different portion of the information presented by public display device 120 may be assigned to be the marker; private display devices may be notified of the new marker and new positioning data for use in positioning private information to be displayed by the private display devices.

Embodiment 500A is from the point-of-view of user 103-2 who is standing. As such, user 103-2 (and thus the point-of-view sensor of the private display device used by user 103-2) has an unobstructed view of graphic 530. However, this may not be true for user 103-3, whose view of graphic 530 is obstructed by another person (as illustrated by dashed arrow 555). Therefore, graphic 530 may not serve as a marker for accurate positioning of private data for user 103-3. Accordingly, a different marker may be defined for either all private display devices or specifically for the private display device of user 103-3.

User 103-3, via his private display device, may provide feedback to the display control device in communication with public display device 120 and the private display devices. The feedback may request a different marker be defined. The feedback may also indicate that the reason for the new marker request is due to obstruction of the previously defined marker. Accordingly, this may prompt the display control system to define a marker that is located in a different position on the public display device than graphic 530. In some embodiments, rather than feedback being provided by the private display device of user 103-3, the display control system may monitor the environment of users 103 and public display device 120 and may assess whether a new marker should be defined based on conditions present in the environment (e.g., ambient lighting, a large crowd of people, etc.). For example, referring to FIG. 2B, such monitoring may be performed by environmental sensors 286 and/or private display device monitoring module 287.

FIG. 5B illustrates an embodiment 500B of the scene of FIG. 5A in which multiple users are viewing the same or different sets of private information via private display devices. Embodiment 500B may include an implementation of system 100B of FIG. 1B. Embodiment 500B of the scene is from the point of view of a user, such as user 103-2 of FIG. 1B.

In embodiment 500B, graphic 533 is serving as a non-dedicated marker and has been defined by the display control system and indicated to the private display device of user 103-3. In some embodiments, graphic 533 may also be indicated to the private display devices of other users (at least some of such private display devices may have successfully located graphic 530) as a marker. Updated vector, coordinates, or other positioning information (represented by dotted lines 540-3 and 540-4) may be provided to the private display device of user 103-3 (and/or private display devices of other users) for use in positioning the private information. As illustrated by dashed line 556, the line of sight of the private display device of user 103-3 to graphic 533 being used as the marker is unobstructed. Therefore, graphic 533 may successfully serve as a marker for use in positioning private information 510 for the private display device of user 103-3.

FIG. 5C illustrates an embodiment 500C of the scene of FIG. 5A in which multiple users are viewing the same or different sets of private information via private display devices. Embodiment 500C may include an implementation of system 100B of FIG. 1B. Embodiment 500C of the scene is from the point-of-view of a user, such as user 103-2 of FIG. 1B. For the purposes of embodiment 500C, it is assumed that another marker is needed to be defined because a private display device, such as private display device of user 103-3, could not locate or track graphic 533 that was being used as the marker in embodiment 500B. As such, embodiment 500C may be implemented if the marker of embodiment 500B was insufficient for one or more private display devices. Alternatively, embodiment 500C may be presented initially (rather than being presented after a non-dedicated marker was determined to be insufficient).

In embodiment 500C, a dedicated marker 537 has been defined by the display control system, presented by public display device 120, and indicated to the private display device of user 103-3. In some embodiments, dedicated marker 537 may also be indicated to the private display devices of other users (at least some of such private display devices may have successfully located graphic 530, which may have been previously used as the marker). Updated vector, coordinates, or other positioning information (represented by dotted lines 540-5 and 540-6) may be provided to the private display device of user 103-3 (and/or private display devices of other users) for use in positioning the private information relative to the dedicated marker 537.

Dedicated marker 537, while visible to the field-of-view sensor of one or more private display devices, may be fully or partially obscured to the view of one or more users by the display of private information by the user's private display device, such as by private information 510-1 (if being presented to that particular user). For illustration purposes, only a portion of dedicated marker 537 is obscured or overlapped by private information 510-1. In other embodiments, it should be understood that private information may be completely obscured or overlapped by dedicated marker 537. In some embodiments, private information may be semi-transparent such that the user can partially see dedicated marker 537.

Dedicated marker 537 may be presented in a region of public display device 120 identified by the display control system to be unused or less important than other regions. For example, a region of solid color or not having text may be selected for presentation of dedicated marker 537. In some embodiments, dedicated marker 537 may be presented in a predefined location on public display device 120, such as the extreme upper left. The size of dedicated marker 537 (and of non-dedicated markers) may be selected based on the size of public display device 120 and/or the estimated or actual distance between public display device 120 and private display devices of the user's viewing public display device 120. The farther one or more users using private display devices in conjunction with public display device 120 are located from public display device 120, the larger the marker may be displayed to increase the likelihood of successful location tracking of the marker.

Dedicated marker 537 may be presented for private display devices to initially locate the private information for display. A non-dedicated marker may then be used for tracking by the private display devices, thus allowing dedicated marker 537 to no longer be displayed once tracking begins. Based upon feedback from private display devices, the display control system may determine whether dedicated marker 537 is eligible to be no longer displayed. For instance, if each private display device is successfully tracking a non-dedicated marker (e.g., graphic 533 of FIG. 5B), dedicated marker 537 may be removed from display on public display device 120. Accordingly, the definition and display of non-dedicated and dedicated markers may be dynamically adjusted by the display control system based on feedback from one or more private display devices and/or ambient environmental sensors. As another example, if the ambient lighting in the conference room of embodiment 500B is increased (thus decreasing the perceived contrast of public display device 120, which may be a projector), dedicated marker 537 may be displayed by public display device 120 along with an indication of dedicated marker 537 being provided to the private display devices along with positioning information to preemptively assist private display devices in properly positioning the private information.

Figure 6:
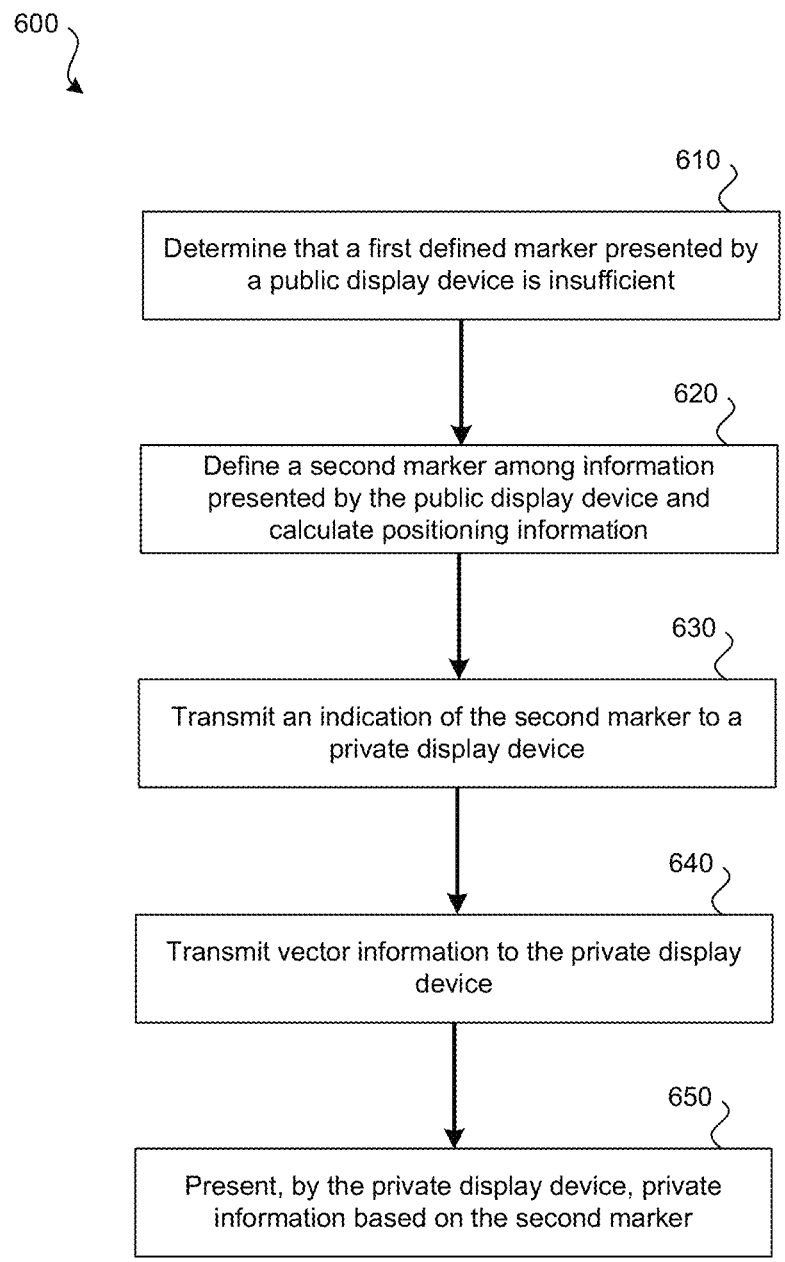
FIG. 6 illustrates an embodiment of a method for defining a marker.

Various methods may be performed using the systems presented, described, and implemented in relation to FIGS. 1A-5C. FIG. 6 illustrates an embodiment of a method 600 for defining a marker. Method 600 may be performed using systems 100A and 100B of FIGS. 1A and 1B, display control system 110 of FIG. 2, and private display device 300 of FIG. 3. For example, method 600 may be performed in situations similar to embodiment 400A of FIG. 4A and embodiment 500A of FIG. 5A. It should be understood that method 600 may be performed using various embodiments of systems differing from systems 100A and 100B of FIGS. 1A and 1B, display control system 110 of FIG. 2, and private display device 300 of FIG. 3. In some embodiments, each step of method 600, unless otherwise noted, may be performed by a display control system. The steps of method 600 may be implemented using software, firmware, and/or hardware. For instance, instructions to perform steps of method 600 may be stored and executed by general-purpose computer components, such as components of computer system 800 of FIG. 8. Accordingly, means for performing the steps of method 600 include one or more instances of: components of system 1A and system 1B of FIG. 1A and FIG. 1B, components of display control system 110, components of private display device 300 of FIG. 3, and/or components of computer system 800 of FIG. 8.

Prior to step 610 of method 600, a dedicated or non-dedicated marker may be defined among public information presented by a public display device and used to position private information for presentation via a private display device to a user, such as defined in related U.S. application Ser. No. 14/012,335, filed Aug. 28, 2013, entitled "Integration of Head Mounted Displays with Public Display Devices", which is incorporated in its entirety by reference for all purposes. Method 600 focuses on when the marker is changed in relation to observed changes in the environment and/or feedback from the private display device.

In method 600, at step 610, the display control system may determine that a first defined marker that is being presented by a public display device is insufficient for continued use in positioning private information for display to a user. This insufficient marker may be a non-dedicated marker or may be a dedicated marker. In some embodiments, the marker is determined to be insufficient based on feedback received from a private display device, which may be an HMD. This feedback may be provided by a user via the private display device, may be based upon the private display device being unable to locate the first defined marker, may be based upon environmental data received via one or more environmental sensors present on one or more private display devices, and/or may be based upon environmental data received from one or more environmental sensors of the display control system. Therefore, in some embodiments, the display control system is receiving feedback that indicates that the first defined marker is insufficient. In some embodiments, it is assessed whether the first defined marker is likely to be sufficient or not based on observed environmental data. Means for performing step 610 include a display control system. More specifically, means for performing step 610 may include one or more instances of computerized components, such as described in relation to FIG. 8, a marker definition engine, a private display device feedback engine, a private display device monitoring module and a private display interface. Other components may also be involved in performing step 610.

At step 620, a second marker may be defined. In the illustrated embodiment of method 600, the marker defined is a non-dedicated marker. Therefore, at least a portion of the public information to be presented to the user (and/or one or more other persons) is used in the second marker. The second marker defined at step 620 may have one or more characteristics defined to be different from the first defined marker. Such differing characteristics may include: content, size, location on the public display device, contrast, and brightness. In some embodiments, a characteristic that differs may include the second marker being a different piece of information (e.g., text, graphic, and/or both) than the first defined marker. The second marker may be defined based on received feedback or environmental information. For instance, if feedback is received and indicates the first defined marker was obstructed, the second defined marker may be located in a different region of the public display device in an attempt to avoid obstruction. Similarly, if environmental data is received and indicates a high level of ambient lighting in the vicinity of the public display device, the second defined marker may have a high level of contrast. Further, at step 620, vectors, coordinates, or another form of positioning information may be determined that indicates where private information should be presented in relation to the second marker. Means for performing step 620 include a display control system. More specifically, means for performing step 620 may include one or more instances of computerized components, such as described in relation to FIG. 8, and a marker definition engine. Other components may also be involved in performing step 620.

Whether the second marker is a dedicated marker or non-dedicated marker may be based on user-defined preferences. For instance, since the non-dedicated first marker was determined to be insufficient, the second marker defined at step 620 may instead be a dedicated marker. If a dedicated marker is used at step 620, the display control system may output the dedicated marker for display to the public display device. In some embodiments, only non-dedicated markers are used. In other embodiments, only dedicated markers are used. In still other embodiments, non-dedicated markers may be used unless one or more private display devices have difficulty locating and/or tracking the non-dedicated markers; then one or more dedicated markers may be used.

At step 630, once the second marker has been defined, an indication of the second marker may be provided to the private display device. This indication of the second marker may be used by the private display device to locate the second marker as displayed by the public display device. Means for performing step 630 include a display control system. More specifically, means for performing step 630 may include one or more instances of computerized components, such as described in relation to FIG. 8, and a private display interface. Other components may also be involved in performing step 630.

Locating the second marker displayed by the public display device may involve one or more images being captured by the private display device of the public display device. These one or more images may be searched for the second marker. At step 640, vector information, or some other form of positioning information such as coordinates, may be transmitted to the private display device. The vector information transmitted at step 640 may indicate where private information should be positioned for display by the private display device in relation to the second marker. If the private information to be presented is the same private information as was attempted to be presented in relation to the first defined marker, the vector information or other form of positioning information may be defined such that the private information is presented in the same location as would have been if the first defined marker was sufficient for positioning. If the private information to be presented has changed, the private information may also be transmitted to the private display device. Otherwise, the private information that was previously transmitted to the private display device may be positioned for display using the indication of the second marker and positioning information transmitted at steps 630 and 640. Means for performing step 640 include a display control system. More specifically, means for performing step 640 may include one or more instances of computerized components, such as described in relation to FIG. 8, and a private display device interface. Other components may also be involved in performing step 640.

At step 650, the private display device may present the private information in relation to the second marker. This private information may be presented to the user. The presentation of the private information by the private display device at step 650 may be positioned for display in relation to the second marker based on the received vector, coordinates, or other positioning information. Therefore, at step 650, to the user, it may appear that both the private information and the public information are being presented by the public display device. The user may have this impression because the private information is being (at least partially) overlaid by the private display device on the user's view of the public display device. Means for performing step 650 include a display control system. More specifically, means for performing step 650 may include one or more instances of computerized components, such as described in relation to FIG. 8, a private display device. Other components may also be involved in performing step 650.

Figure 7:
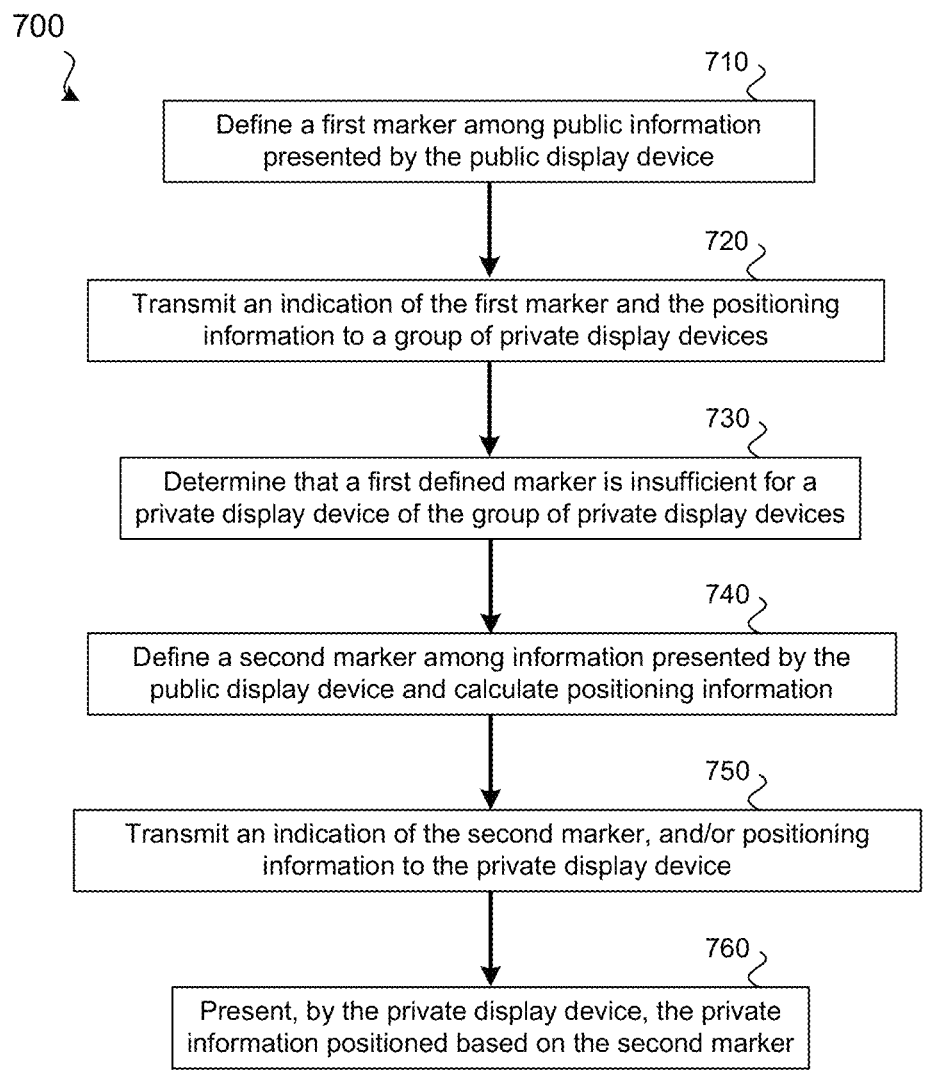
FIG. 7 illustrates an embodiment of a method for defining markers for a plurality of users in conjunction with a single public display.

FIG. 7 illustrates another embodiment of a method 700 for defining a marker. Method 700 may be performed using system 100B of FIG. 1B, display control system 110 of FIG. 2, and private display device 300 of FIG. 3. For example, method 700 may be performed in a situation similar to embodiment 500A of FIG. 5A. It should be understood that method 700 may be performed using various embodiments of systems differing from system 100B of FIG. 1B, display control system 110 of FIG. 2, and private display device 300 of FIG. 3. In some embodiments, each step of method 700, unless otherwise noted, may be performed by a display control system. The steps of method 700 may be implemented using software, firmware, and/or hardware. For instance, instructions to perform steps of method 700 may be stored and executed by general-purpose computer components, such as components of computer system 800 of FIG. 8. Accordingly, means for performing the steps of method 600 include one or more instances of: components of system 1B of FIG. 1B, components of display control system 110, components of private display device 300 of FIG. 3, and/or components of computer system 800 of FIG. 8. Method 700 focuses on an environment, such as in FIGS. 1B and 5A, where multiple private display devices are being used in conjunction with a common public display device.

At step 710, a first marker, which may be a non-dedicated marker, may be defined among public information being output to a public display device for presentation. Positioning information, which may take the form of coordinates or a vector, may indicate where private information is to be presented in relation to the first marker which is presented by a public display device viewed by users, who are using a group of private display devices, such as illustrated in FIGS. 1B and 5A. Means for performing step 710 include a display control system. More specifically, means for performing step 710 may include one or more instances of computerized components, such as described in relation to FIG. 8, and a marker definition engine. Other components may also be involved in performing step 710.

At step 720, an indication of the first marker and the positioning information may be transmitted to each private display device of the group of private display devices. This group of private display devices may include two or more private display devices, which each may be an HMD. If the private information has not already been transmitted to the group of private display devices, the private information may also be transmitted to the group of private display devices at step 720. The private information presented to the group of private display devices may be the same or may vary by user. Therefore different users of different private display devices may be presented different private information which may also be positioned differently in relation to the public display device. However, even if different private information is presented (and possibly in different locations in relation to the public display device), a same marker may be used for each of the private display devices (possibly with different positioning information). Means for performing step 720 include a display control system. More specifically, means for performing step 720 may include one or more instances of computerized components, such as described in relation to FIG. 8, and a private display device interface. Other components may also be involved in performing step 720.

At step 730, the display control system may determine that the first defined marker that is being presented by public display device is insufficient for continued use in positioning private information for display to a user via a particular private display device of the group of private display devices. In some embodiments, the marker is determined to be insufficient based on feedback received from the private display device of the group of private display devices. This feedback may be provided by a user via the private display device, may be based upon the private display device being unable to locate the first defined marker, may be based upon environmental data received via one or more environmental sensors present on one or more private display devices, and/or may be based upon environmental data received from one or more environmental sensors of the display control system. Therefore, in some embodiments, the display control system is receiving feedback that indicates that the first defined marker is insufficient for the particular private display device. In some embodiments, it is assessed whether the first defined marker is likely to be sufficient or not based on observed environmental data. Means for performing step 730 include a display control system. More specifically, means for performing step 730 may include one or more instances of computerized components, such as described in relation to FIG. 8, a private display device feedback module, private display device interface, and a private display device monitoring module. Other components may also be involved in performing step 730.

At step 740, a second marker may be defined. The second marker defined may be a dedicated or non-dedicated marker. The second marker defined at step 740 may have one or more characteristics that differ from the first defined marker. Such differing characteristics may include: size, location on the public display device, contrast, and brightness. In some embodiments, the characteristic that differs may include the second marker being a different piece of information (e.g., text, graphic, and/or both) than the first defined marker. The second marker may be defined based on received feedback or environmental information. For instance, if feedback is received from the private display device and indicates the first defined marker was obstructed, the second defined marker may be located in a different portion of the public display device in an attempt to avoid obstruction. Similarly, if environmental data is received and indicates a high level of ambient lighting in the vicinity of the public display device, the second defined marker may have a high level of contrast. Further, at step 720, vectors, coordinates, or another form of positioning information may be determined that indicates where private information should be presented in relation to the second marker. Means for performing step 740 include a display control system. More specifically, means for performing step 740 may include one or more instances of computerized components, such as described in relation to FIG. 8, a marker definition engine, and a data classification engine. Other components may also be involved in performing step 740.

Whether the second marker is a dedicated marker or non-dedicated marker may be based on user-defined preferences. For instance, since the non-dedicated first marker was determined to be insufficient, the second marker defined at step 740 may instead be a dedicated marker. If a dedicated marker is used at step 740, the display control system may output the dedicated marker for display to the public display device. In some embodiments, only non-dedicated markers are used. In other embodiments, only dedicated markers are used. In still other embodiments, non-dedicated markers may be used unless one or more private display devices are having difficulty locating and/or tracking the non-dedicated markers; then one or more dedicated markers may be used.

At step 750, an indication of the second marker and positioning information may be transmitted to the private display device. In some embodiments, the indication of the second marker and the related positioning device may only be transmitted to the private display device for which the first marker was insufficient. Other private display devices may continue to use the first marker and its associated positioning information. In other embodiments, the second marker and associated positioning information may also be provided to other private display devices of the group of private display devices. Means for performing step 750 include a display control system. More specifically, means for performing step 750 may include one or more instances of computerized components, such as described in relation to FIG. 8, and a private display device interface. Other components may also be involved in performing step 750.

At step 760, the private display device for which the first marker was insufficient may present the private information presented based on the second marker and the associated positioning information. The other private display devices may continue to use the first marker and the associated positioning information for presentation of private information. If the indication of the second marker associated positioning information was provided to each private display device of the group of private display devices, these private display devices may also use the second marker and associated positioning information or may store the second marker and associated positioning information for a future possible situation in which the first marker can no longer be located or tracked. Means for performing step 760 include a display control system. More specifically, means for performing step 760 may include one or more instances of computerized components, such as described in relation to FIG. 8, and a private display device. Other components may also be involved in performing step 760.

Method 700 may repeat as necessary as the private information to be displayed changes, and it is determined that one or more private display devices cannot locate or track a marker, and/or the public information presented by the public display device changes and therefore requires that a new marker be defined or presented.

Figure 8:
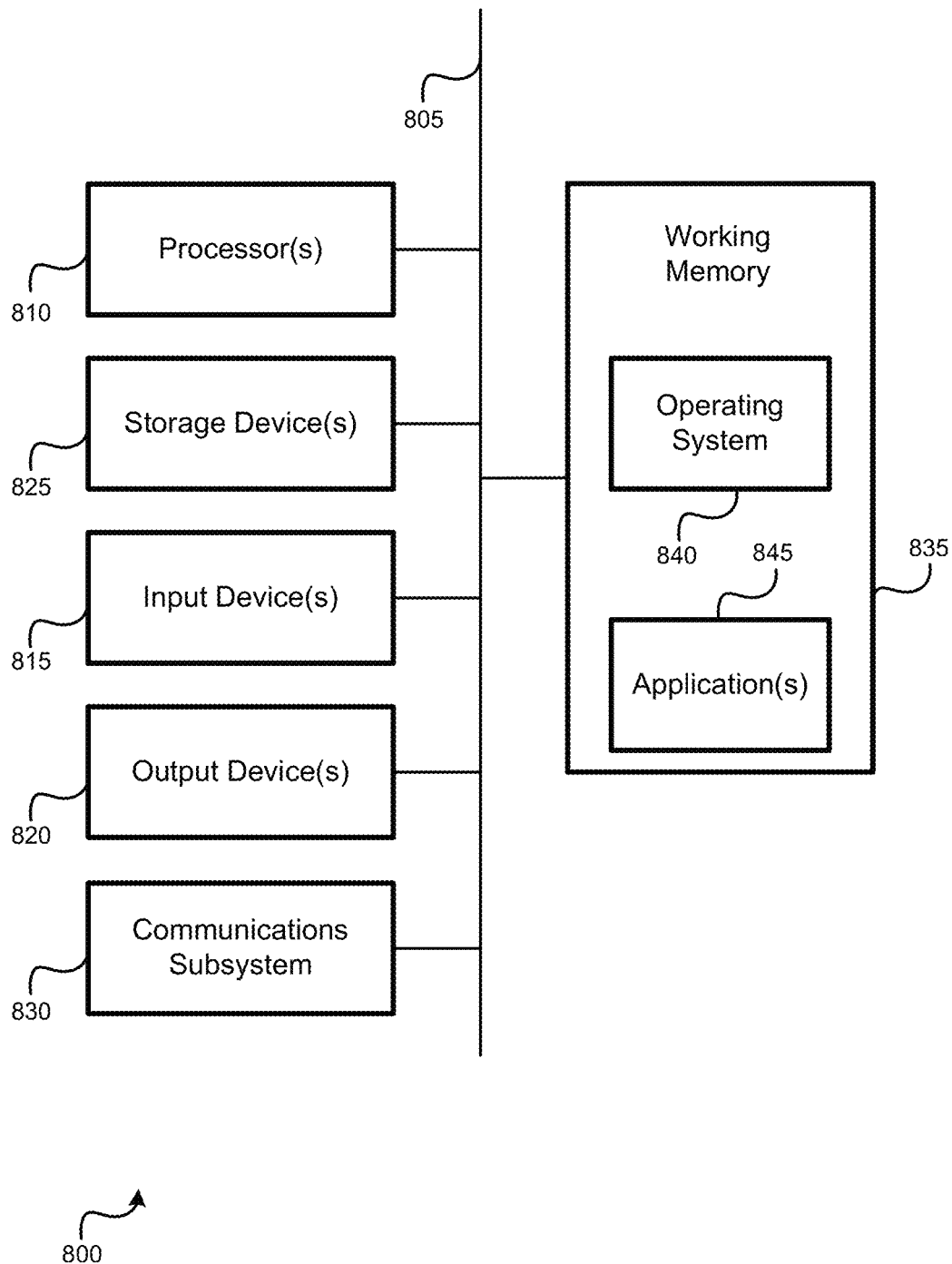
FIG. 8 illustrates an embodiment of a computer system.

FIG. 8 illustrates an embodiment of a computer system. A computer system as illustrated in FIG. 8 may be incorporated as part of the previously described computerized devices, such as the display control systems, public display devices, and private display devices. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like. Output devices 820 may include a public display device.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 (which may correspond to operating system 222 of FIGS. 2A and 2B), device drivers, executable libraries, and/or other code, such as one or more application programs 845 (which may correspond to application 224 of FIGS. 2A and 2B), which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein. For instance, processor(s) 810 may perform various functions of the components of the display control systems of FIGS. 1, 2A, and 2B, such as data classification analysis engine 210 and marker definition engine 240.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. For instance, non-transitory storage device(s) 825 may store display analysis rules database 230 of FIGS. 2A and 2B. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810. Communications subsystem 830 may perform functions of private display interface 280 for communicating with a private display device.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined.

Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for defining a marker, the method comprising:
    determining, by a display control system, that a first defined marker presented by a public display device separate from and communicatively coupled to the display control system is insufficient for use by a head mounted display separate from and communicatively coupled to the display control system, wherein
        the first defined marker is used as a reference point for positioning information for display by the head mounted display;
    in response to determining that the first defined marker is insufficient, defining, by the display control system, a second marker displayed by the public display device, the second marker being at a different location than the first defined marker, wherein
        the second defined marker is used as the reference point for positioning the information for display by the head mounted display; and
    transmitting, by the display control system, an indication of the second marker to the head mounted display enabling the head mounted display to locate the second marker.

2. The method for defining the marker of claim 1, wherein determining that the first defined marker presented by the public display device is insufficient for use by the head mounted display comprises:
    receiving, by the display control system, feedback from the head mounted display, that indicates the first defined marker cannot be located.

3. The method for defining the marker of claim 1, wherein determining that the first defined marker presented by the public display device is insufficient for use by the head mounted display comprises:
    receiving, by the display control system, distance data indicating a distance between the public display device and the head mounted display; and
    determining, by the display control system, that the first defined marker is insufficient based at least on the distance between the public display device and the head mounted display.

4. The method for defining the marker of claim 1, wherein determining that the first defined marker presented by the public display device is insufficient for use by the head mounted display comprises:
    measuring, by the display control system, an amount of ambient lighting in a vicinity of the public display device; and
    determining, by the display control system, that the first defined marker is insufficient based at least on the amount of ambient lighting.

5. The method for defining the marker of claim 1, wherein determining the indication that the first defined marker presented by the public display device is insufficient for use by the head mounted display comprises:
    calculating, by the head mounted display, a distance between the head mounted display and the public display device; and
    transmitting, by the head mounted display, an indication of the distance to the display control system.

6. The method for defining the marker of claim 1, wherein:
    the second defined marker is larger in size than the first defined marker.

7. The method for defining the marker of claim 1, further comprising:
    defining, by the display control system, a third marker displayed by the public display device concurrently with the second marker, the third marker having a display characteristic different from display characteristics of the second defined marker, wherein
        the third defined marker is used as the reference point for positioning information for display by a second head mounted display; and
    transmitting, by the display control system, the third marker to the second head mounted display.

8. The method for defining the marker of claim 7, wherein the third defined marker and the second defined marker are presented simultaneously as part of public information presented by the public display device.

9. The method for defining the marker of claim 1, wherein the second defined marker is a dedicated marker presented by the public display device.

10. The method for defining the marker of claim 1, wherein the display control system determines information to be displayed on the public display device and the head mounted display.

11. The method of claim 1, wherein determining the first defined marker presented by the public display device is insufficient for use by the head mounted display is performed by the display control system automatically without user input.

12. A system for defining a marker, the system comprising:
one or more processors; and
a memory communicatively coupled with and readable by the one or more processors and having stored therein processor-readable instructions which, when executed by the one or more processors, cause the one or more processors to:
determine that a first defined marker presented by a public display device separate from and communicatively coupled to the system is insufficient for use by a head mounted display separate from and communicatively coupled to the system, wherein
the first defined marker is used as a reference point for positioning information for display by the head mounted display;
in response to determining that the first defined marker is insufficient, define a second marker displayed by the public display device, the second marker being at a different location than the first defined marker, wherein the second defined marker is used as the reference point for positioning the information for display by the head mounted display; and
transmit an indication of the second marker to the head mounted display enabling the head mounted display to locate the second marker.

13. The system for defining the marker of claim 12, wherein the processor-readable instructions that cause the one or more processors to determine that the first defined marker presented by the public display device is insufficient for use by the head mounted display comprises processor-readable instructions which, when executed, cause the one or more processors to:
receive feedback from the head mounted display, that indicates the first defined marker cannot be located.

14. The system for defining the marker of claim 12, wherein the processor-readable instructions that cause the one or more processors to determine that the first defined marker presented by the public display device is insufficient for use by the head mounted display comprises processor-readable instructions which, when executed, cause the one or more processors to:
receive distance data indicating a distance between the public display device and the head mounted display; and
determine that the first defined marker is insufficient based at least on the distance between the public display device and the head mounted display.

15. The system for defining the marker of claim 12, wherein the processor-readable instructions that cause the one or more processors to determine that the first defined marker presented by the public display device is insufficient for use by the head mounted display comprises processor-readable instructions which, when executed, cause the one or more processors to:
measure an amount of ambient lighting in a vicinity of the public display device; and
determine that the first defined marker is insufficient based at least on the amount of ambient lighting.

16. The system for defining the marker of claim 12, further comprising:
the head mounted display, configured to:
calculate a distance between the head mounted display and the public display device; and
transmit an indication of the distance to the display control system.

17. The system for defining the marker of claim 12, wherein the second defined marker is larger in size than the first defined marker.

18. The system for defining the marker of claim 12, wherein the processor-readable instructions, when executed, further cause the one or more processors to:
define a third marker displayed by the public display device concurrently with the second marker, the third marker having a display characteristic different from display characteristics of the second defined marker, wherein
the third defined marker is used as the reference point for positioning information for display by a second head mounted display; and
transmit the third marker to the second head mounted display.

19. The system for defining the marker of claim 18, wherein the third defined marker and the second defined marker are presented simultaneously as part of public information presented by the public display device.

20. The system for defining the marker of claim 12, wherein the second defined marker is a dedicated marker presented by the public display device.

21. A non-transitory processor-readable medium for defining a marker, comprising processor-readable instructions configured to cause one or more processors of a display control system to:
determine that a first defined marker presented by a public display device separate from and communicatively coupled to the display control system is insufficient for use by a head mounted display separate from and communicatively coupled to the display control system, wherein
the first defined marker is used as a reference point for positioning information for display by the head mounted display;
in response to determining that the first defined marker is insufficient, define a second marker displayed by the public display device, the second marker being at a different location than the first defined marker, wherein the second defined marker is used as the reference point for positioning the information for display by the head mounted display; and
transmit an indication of the second marker to the head mounted display enabling the head mounted display to locate the second marker.

22. The non-transitory processor-readable medium for defining the marker of claim 21, wherein the processor-readable instructions configured to cause the one or more processors to determine that the first defined marker presented by the public display device is insufficient for use by the head mounted display comprises processor-readable instructions configured to cause the one or more processors to:
receive feedback from the head mounted display, that indicates the first defined marker cannot be located.

23. The non-transitory processor-readable medium for defining the marker of claim 21, wherein the processor-readable instructions configured to cause the one or more processors to determine that the first defined marker presented by the public display device is insufficient for use by the head mounted display comprises processor-readable instructions configured to cause the one or more processors to:

receive distance data indicating a distance between the public display device and the head mounted display; and determine that the first defined marker is insufficient based at least on the distance between the public display device and the head mounted display.

24. The non-transitory processor-readable medium for defining the marker of claim 21, wherein the processor-readable instructions configured to cause the one or more processors to determine that the first defined marker presented by the public display device is insufficient for use by the head mounted display comprises processor-readable instructions configured to cause the one or more processors to:

measure an amount of ambient lighting in a vicinity of the public display device; and determine that the first defined marker is insufficient based at least on the amount of ambient lighting.

25. The non-transitory processor-readable medium for defining the marker of claim 21, wherein the processor-readable instructions configured to cause the one or more processors to determine that the first defined marker presented by the public display device is insufficient for use by the head mounted display comprises processor-readable instructions configured to cause the one or more processors to:

receive, from the head mounted display, an indication of a distance between the head mounted display and the public display device to the display control system.

26. The non-transitory processor-readable medium for defining the marker of claim 21, wherein the second defined marker is larger in size than the first defined marker.

27. The non-transitory processor-readable medium for defining the marker of claim 21, wherein the processor-readable instructions are further configured to cause the one or more processors to:

define a third marker displayed by the public display device concurrently with the second marker, the third marker having a display characteristic different from display characteristics of the second defined marker, wherein the third defined marker is used as the reference point for positioning information for display by a second head mounted display; and transmit the third marker to the second head mounted display.

28. The non-transitory processor-readable medium for defining the marker of claim 27, wherein the third defined marker and the second defined marker are presented simultaneously as part of public information presented by the public display device.

29. The non-transitory processor-readable medium for defining the marker of claim 21, wherein the second defined marker is a dedicated marker presented by the public display device.

30. An apparatus for defining a marker, the apparatus comprising:

means for determining that a first defined marker presented by a means for public display separate from and communicatively coupled to the apparatus is insufficient for use by a means for private display separate from and communicatively coupled to the apparatus, wherein the first defined marker is used as a reference point for positioning information for display by the means for private display;

means for defining a second marker displayed by the means for public display in response to determining that the first defined marker is insufficient, the second marker being at a different location than the first defined marker, wherein the second defined marker is used as the reference point for positioning the information for display by the means for private display; and means for transmitting an indication of the second marker to the means for private display enabling the means for private display to locate the second marker.

31. The apparatus for defining the marker of claim 30, wherein the means for determining that the first defined marker presented by the means for public display is insufficient for use by the means for private display comprises:

means for receiving feedback from the means for private display, that indicates the first defined marker cannot be located.

32. The apparatus for defining the marker of claim 30, wherein the means for determining that the first defined marker presented by the means for public display is insufficient for use by the means for private display comprises:

means for receiving distance data indicating a distance between the means for public display and the means for private display; and means for determining that the first defined marker is insufficient based at least on the distance between the means for public display and the means for private display.

33. The apparatus for defining the marker of claim 30, wherein the means for determining that the first defined marker presented by the means for public display is insufficient for use by the means for private display comprises:

means for measuring an amount of ambient lighting in a vicinity of the means for public display; and means for determining that the first defined marker is insufficient based at least on the amount of ambient lighting.

34. The apparatus for defining the marker of claim 30, wherein the means for determining that the first defined marker presented by the means for public display is insufficient for use by the means for private display comprises:

means for calculating a distance between the means for private display and the means for public display; and means for transmitting an indication of the distance to the display control system.

35. The apparatus for defining the marker of claim 30, wherein the second defined marker is larger in size than the first defined marker.

36. The apparatus for defining the marker of claim 30, further comprising:

means for defining a third marker displayed by the means for public display concurrently with the second marker, the third marker having a display characteristic different from display characteristics of the second defined marker, wherein the third defined marker is used as the reference point for positioning information for display by a second means for private display; and means for transmitting the third marker to the second means for private display.

37. The apparatus for defining the marker of claim 36, wherein the third defined marker and the second defined marker are presented simultaneously as part of public information presented by the means for public display.

38. The apparatus for defining the marker of claim 30, wherein the second defined marker is a dedicated marker presented by the means for public display.

\* \* \* \* \*